United States Patent
Akiyoshi et al.

(10) Patent No.: US 7,554,685 B2
(45) Date of Patent: Jun. 30, 2009

(54) IMAGE FORMING APPARATUS, INFORMATION PROCESSING APPARATUS, PROGRAM EXECUTION METHOD AND PROGRAM PRODUCING METHOD

(75) Inventors: Kunihiro Akiyoshi, Fukuoka (JP); Tsutomu Ohishi, Fukuoka (JP); Yuuko Sugiura, Tokyo (JP); Katsuhiko Nakagawa, Fukuoka (JP); Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1154 days.

(21) Appl. No.: 10/626,608

(22) Filed: Jul. 25, 2003

(65) Prior Publication Data

US 2004/0218208 A1     Nov. 4, 2004

(30) Foreign Application Priority Data

| Jul. 26, 2002 | (JP) | ............................... 2002-218814 |
| Sep. 24, 2002 | (JP) | ............................... 2002-276532 |
| Oct. 8, 2002 | (JP) | ............................... 2002-295378 |
| Jul. 22, 2003 | (JP) | ............................... 2003-199947 |
| Jul. 22, 2003 | (JP) | ............................... 2003-199948 |
| Jul. 22, 2003 | (JP) | ............................... 2003-199949 |
| Jul. 22, 2003 | (JP) | ............................... 2003-199950 |

(51) Int. Cl.
    *G06F 15/00* (2006.01)
(52) U.S. Cl. .................. 358/1.15; 717/173; 717/178
(58) Field of Classification Search ................ 358/1.13, 358/1.15; 717/173, 178; 713/155; 726/4
    See application file for complete search history.

(56) References Cited

U.S. PATENT DOCUMENTS

| 4,853,733 | A | 8/1989 | Watanabe et al. |
| 5,317,757 | A | 5/1994 | Medicke et al. |
| 5,610,723 | A | 3/1997 | Yamagishi |
| 6,041,175 | A | 3/2000 | Fukada et al. |
| 6,285,976 | B1 | 9/2001 | Rotbart |
| 6,324,302 | B1 | 11/2001 | Sugiura |
| 6,430,570 | B1 | 8/2002 | Judge et al. |
| 6,493,101 | B1 * | 12/2002 | Okazawa ................... 358/1.15 |
| 6,842,898 | B1 | 1/2005 | Carlson et al. |
| 7,117,493 | B2 * | 10/2006 | Matsushima ............... 717/173 |
| 2002/0066071 | A1 | 5/2002 | Tien et al. |
| 2002/0093699 | A1 | 7/2002 | Masao et al. |
| 2002/0122203 | A1 * | 9/2002 | Matsuda ..................... 358/1.15 |
| 2002/0144257 | A1 | 10/2002 | Matsushima |

(Continued)

FOREIGN PATENT DOCUMENTS

CN            1137655 A           12/1996

(Continued)

OTHER PUBLICATIONS

U.S. Appl. No. 11/248,288, filed Oct. 13, 2005, Ohishi.

(Continued)

*Primary Examiner*—Kimberly A Williams
(74) *Attorney, Agent, or Firm*—Oblon, Spivak, McClelland, Maier & Neustadt, P.C.

(57) ABSTRACT

An image forming apparatus is provided, in which, the image forming apparatus includes: a program obtaining part for sending a screen data for inputting a program to a client terminal, and receiving the program from the client terminal; and a program execution part for executing the program received by the program obtaining part.

16 Claims, 46 Drawing Sheets

U.S. PATENT DOCUMENTS

2003/0214664 A1* 11/2003 Moffatt .................... 358/1.13
2004/0212826 A1* 10/2004 Kashiwazaki ............. 358/1.15
2004/0218208 A1   11/2004 Akiyoshi et al.

FOREIGN PATENT DOCUMENTS

| CN | 1218226 A | 6/1999 |
|---|---|---|
| CN | 1265489 A | 9/2000 |
| CN | 1277387 A | 12/2000 |
| DE | 100 10 504 A1 | 9/2001 |
| EP | 0 592 079 A2 | 4/1994 |
| EP | 0 654 936 A2 | 5/1995 |
| EP | 0 656 585 A2 | 6/1995 |
| EP | 0 675 648 A2 | 10/1995 |
| EP | 0 699 995 A1 | 3/1996 |
| EP | 0 725 332 A2 | 8/1996 |
| EP | 0 816 972 A1 | 1/1998 |
| EP | 1 126 367 A1 | 8/2001 |
| EP | 1 170 939 A2 | 1/2002 |
| GB | 2 332 543 A | 6/1999 |
| JP | 5-224976 | 9/1993 |
| JP | 5-342045 | 12/1993 |
| JP | 10-207657 | 8/1998 |
| JP | 11-338684 | 12/1999 |
| JP | 2000-250758 | 9/2000 |
| JP | 2000-305761 | 11/2000 |
| JP | 2001-147815 | 5/2001 |
| JP | 2001-197340 | 7/2001 |
| JP | 2002-82806 | 3/2002 |
| JP | 2002-152446 | 5/2002 |
| JP | 2002-152458 | 5/2002 |
| JP | 2002-312171 | 10/2002 |
| JP | 2003-125146 | 4/2003 |
| WO | WO 97/43711 | 11/1997 |
| WO | WO 99/42924 | 8/1999 |
| WO | WO 99/63444 | 12/1999 |
| WO | WO 00/01138 | 1/2000 |
| WO | WO 01/35187 A2 | 5/2001 |

OTHER PUBLICATIONS

U.S. Appl. No. 11/250,405, filed Oct. 17, 2005, Shimizu.
U.S. Appl. No. 11/495,569, filed Jul. 31, 2006, Ohishi.
U.S. Appl. No. 10/626,608, filed Jul. 25, 2003, Akiyoshi et al.
U.S. Appl. No. 10/915,333, filed Aug. 11, 2004, Shimizu et al.
U.S. Appl. No. 11/509,601, filed Aug. 25, 2006, Ando, et al.
U.S. Appl. No. 11/216,013, filed Sep. 1, 2005, Ando et al.
U.S. Appl. No. 11/521,495, filed Sep. 15, 2006, Ando.
U.S. Appl. No. 11/521,567, filed Sep. 15, 2006, Ando.
Mitsuhisa Sato, et al., "Cluster-enabled OpenMP: an OpenMP Compiler for Software Distributed Shared Memory System SCASH", vol. 42, No. SIG 9(HPS3), Aug. 15, 2001, pp. 158-169 (with English Abstract).

* cited by examiner

FIG.8

```
# ocr shell script

scanimage -out /hdd/ts/tmp/tmpimg.tif
decomp -in /hdd/ts/tmp/tmpimg.tif -out /hdd/ts/tmp/tmpimg.bmp
ocr -in /hdd/ts/tmp/tmpimg.bmp -out /hdd/ts/tmp/ocrresult.txt
mail xxxxx@yy.zz.co.jp
```

FIG.9

CUSTOMIZE DIRECTORY / FILE NAME hdd/xxx/opepane/shell1
shell2
shell3

FIG.10

KEY ASSOCIATION TABLE

KEY CODE : CUSTOMIZE PROGRAM
501 : shell1
502 : sh ll2
503 : sh ll3

LAUNCH SETTING FILE

| PROGRAM NAME | INTERPRETER (SHELL) |
| PROGRAM NAME | XXX APPLICATION |
| ⋮ | |

FIG.17

LAUNCH SETTING FILE

```
PROGRAM NAME    OPERATION PANEL REGISTRATION PROGRAM
PROGRAM NAME    INTERPRETER (SHELL)
PROGRAM NAME    XXX APPLICATION
                         ⋮
```

FIG.18

| KEY ASSIGNMENT SETTING SCREEN | | | |
|---|---|---|---|
| CUSTOMIZE PROGRAM | KEY (BUTTON) | | |
| Shell1 | A | B | C |
| Shell2 | A | B | C |
| Shell3 | A | B | C |

FIG.21

LAUNCH SETTING FILE

| | |
|---|---|
| PROGRAM NAME | VB INTERPRETER |
| PROGRAM NAME | XXX APPLICATION |
| | ⋮ |

FIG.24

Begin VB. Form Form1
    Caption               = "Form1"
    ClientHeight      = 3390
    ClientLeft        = 60
    ClientTop         = 345
    ClientWidth       = 6990
    LinkTopic         = "Form1"
    ScaleHeight       = 3390
    ScaleWight        = 6990
    StartUpPosition   = 3 'Windows DEFAULT
    Begin VB. CommandButton NEXTWIN
        Caption        = "NEXTWIN"
        Height         = 735
        Left           = 480
        TabIndex      = 0
        Top            = 480
        Width         = 1575
    End
End
Attribute VB_Name = "Form1"
Attribute VB_GlobalNameSpace = False
Attribute VB_Creatable = False
Attribute VB_PredeclaredId = True
Attribute VB_Exposed = False Private Sub NEXTWIN_Click()
    /*Form2 SWITCH TO FORM 2 WINDOW */
    call("change_diplay", "From2")
End Sub

FIG.25

```
Begin VB. Form Form2
    Caption          =   "Form2"
    ClientHeight     =   3390
    ClientLeft       =   60
    ClientTop        =   345
    ClientWidth      =   6990
    LinkTopic        =   "Form2"
    ScaleHeight      =   3390
    ScaleWight       =   6990
    StartUpPosition  =   3 'Windows DEFAULT
    Begin VB. CommandButton START
        Caption      =   "START"
        Height       =   735
        Left         =   4560
        TabIndex     =   2
        Top          =   2040
        Width        =   1815
    End
    Begin VB. CommandButton FAX
        Caption      =   "FAX"
        Height       =   735
        Left         =   2520
        TabIndex     =   1
        Top          =   480
        Width        =   1455
    End
    Begin VB. CommandButton SCAN
        Caption      =   "SCAN"
        Height       =   735
        Left         =   480
        TabIndex     =   0
        Top          =   480
        Width        =   1575
    End
End
Attribute VB_Name = "Form1"
Attribute VB_GlobalNameSpace = False
Attribute VB_Creatable = False
Attribute VB_PredeclaredId = True
Attribute VB_Exposed = False Private Sub FAX_Click()
    FAX = True
End Sub
Private Sub SCAN_Click()
    call("ScanStart", A4, ADF, TIFF, BINARY, "/work/tmpfile.tif")
    gwOpItemCreate(win, MESSAGE_ITEM,
                    ITEM_MESSAGE_X,         0,
                    ITEM_MESSAGE_Y,         12,
                    ITEM_MESSAGE_WIDTH,     100,
                    ITEM_MESSAGE_HEIGHT,    12,
                    ITEM_MESSAGE_CENTER_X,  0,
                    ITEM_MESSAGE_BLINK,     0,
                    ITEM_MESSAGE,           "CHARACTER STRING", 0,
                    ITEM_MESSAGE_FRONT,     FONT_12, 0,
                    0) ;
End Sub Private Sub START_Click()
    START = True
End Sub
```

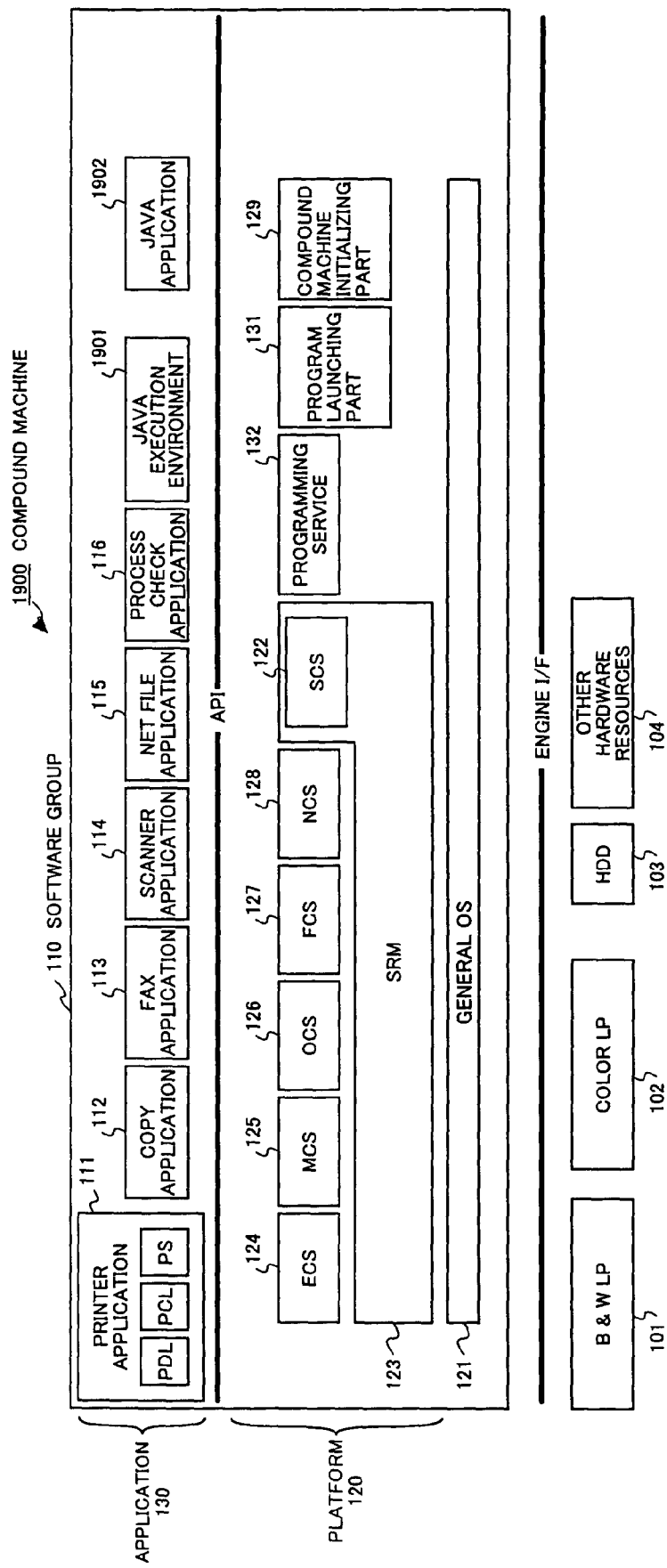

JAVA DEVELOPMENT ENVIRONMENT

FIG.36

```
import java.lang.*;
import com.ricoh.gw.panel.*;                              //←①
public class UserApp extends GWApp                        //←②
{
    public void main()
    {
        Panel panel = new Panel();
        PanelWindow mainwindow =
        new PanelWindow(panel.root());
        ItemString hello = new ItemString("Hello World");  //←③
        MessageItem salutation = new MessageItem(hello);
        salutation.setRect(100, 10, 100, 10);
        mainwindow.addItem(salutation);
        ItemString inputstr =
        new ItemString("Get input...");
        ButtonItem inputButton = new ButtonItem();         //←④
        inputButton.setButtonShape(ButtonItem.BTN_ZAB);
        inputButton.setRect(100, 100, 100, 100);
        inputButton.setWink(true);
        inputButton.addChangeListener(
            new GWChangeListener()
            {
                public void stateChanged(GWEvent e)
                {
                    String answer =
                        SoftKeyboardWindow.request(
                            "Add your Input",
                            "", 256,
                            ItemString.LANG_ENGLISH_US
                        );
                    inputdisplay.setMessage(
                        new ItemString(answer));
                    inputdisplay.paint();
                }
            }
        );
        mainwindow.addItem(inputButton);
        ItemString label1 =
            new ItemString("Your Input Was...");           //←⑤
        MessageItem label = new MessageItem(label1);
        label.setRect(100, 110, 200, 10);
        mainwindow.addItem(label);
        ItemString outputstr = new ItemString("");
        MessageItem
        inputdisplay = new MessageItem(outputstr);         //←⑥
        inputdisplay.setRect(100, 125, 200, 10);
        mainwindow.addItem(inputdisplay);
```

FIG.42 http://xxx.xxx/xx/aaa.jar
http://xxx.xxx/xx/bbb.jar
http://xxx.xxx/xx/ccc.jar

```
#define THREAD_NO 1              //THREAD NUMBER :1
typedef struct {                 //DEFINITION OF SHARED VARIABLE
    int    demoData;
} demoCommonParm_t;

#undef  COMMON_STRUCT
define COMMON_STRUCT demoCommonParm_t  // DEFINITION FOR ACCESSING SHARED VARIABLE enum DEMO_STATE{                 // DEFINITION OF STATE
    DEMO_ST_IDLE,
    DEMO_ST_RUN
};

owner TypeFunc_t eventDemoIdle[] = // EVENT FUNCTION TABLE OF STATE DEMO_ST_IDLE
{
    { 1,  evDemoIdle },
    { 0,  0          }
};

owner TypeFunc_t eventDemoRun[] = // EVENT FUNCTION TABLE OF STATE DEMO_ST_RUN
{
    { 2,  evDemoRun },
    { 0,  0         }
};

stateInfo_t demoStTbl[] = // STATE INFORMATION TABLE
{
    { enterDemoIdle,  eventDemoIdle },
    { enterDemoRun,   eventDemoRun  }
};
```

FIG.50

```
/*****************************************************
        execDemoFunc
*****************************************************/
void    execDemoFunc(void)
{
        int ret;
        COMMON_STRUCT *pCom;        //DEFINITION OF SHARED VARIABLE STRUCTURE POINTER
        pCom = (COMMON_STRUCT *)malloc(sizeof(COMMON_STRUCT));
                                // AREA RESERVE FOR SHARED VARIABLE
        pCom->demoData = 0;   // SET OF SHARED VARIABLE ret = StMachine(THREAD_NO, demoStTble, DEMO_ST_IDLE, pCom);  // LAUNCH
        free(pCom);             // RELEASE OF SHARED VARIABLE
}

/*****************************************************
        enterDemoIdle  ENTRY FUNCTION
*****************************************************/
void    enterDemoIdle(void)
{
        ...
}
/*****************************************************
        evDemoIdle     EVENT FUNCTION
*****************************************************/
void    evDemoIdle(void)
{
        ...
}
/*****************************************************
        enterDemoRun   ENTRY FUNCTION
*****************************************************/
void    enterDemoRun(void)
{
        ...
}
/*****************************************************
        evDemoRun      EVENT FUNCTION
*****************************************************/
void    evDemoRun(void)
{
        ...
}
```

IMAGE FORMING APPARATUS, INFORMATION PROCESSING APPARATUS, PROGRAM EXECUTION METHOD AND PROGRAM PRODUCING METHOD

BACKGROUND OF THE INVENTION

1. Field of the Invention

The present invention relates to an image forming apparatus and an information processing apparatus to improve efficiency of development of programs and efficiency of execution of programs.

2. Description of the Related Art

Recently, an image forming apparatus (to be referred to as a compound machine hereinafter) that includes functions of a printer, a copier, a facsimile, a scanner and the like in a cabinet is generally known. The compound machine includes a display part, a printing part and an image pickup part and the like in a cabinet. In the compound machine, three pieces of software corresponding to the printer, copier and facsimile respectively are provided, so that the compound machine functions as the printer, the copier, the scanner and the facsimile respectively by switching the software.

According to such a conventional compound machine, an operation panel is provided for the user to operate the compound machine. The operation panel includes an operation display part (LCD panel) for displaying an operation screen and for performing touch operation. According to such a conventional compound machine, since capabilities that are provided to the user are predetermined, operations performed by the user for the compound machine are not largely changed. Thus, it is not necessary to customize the display screen and touch operations on the operation display part. Thus, customizing capability for the operation display part is not provided for the conventional compound machine.

Since the conventional compound machine is provided with pieces of software for the printer, the copier, the scanner and the facsimile individually, much time is required for developing the software. Therefore, the applicant has developed an image forming apparatus (compound machine) including hardware resources, a plurality of applications, and a platform including various control services provided between the applications and the hardware resources. The hardware resources such as a display part, a printing part and an image pickup part are used for image forming processing. The applications perform processing for user services corresponding to printer, copier and facsimile and the like. The platform includes various control services performing management and execution control of hardware resources necessary for at least two applications commonly, and performing image forming processing. The processing performed by the control services can be called system side processing.

According to such a new compound machine, the applications and the control services are provided separately. Thus, after the compound machine is shipped, users or third party venders can develop new applications to install in the compound machine. By doing so, various functions can be provided.

Therefore, it may be necessary to provide capabilities different from the predetermined capabilities for operation of the operation display part for new applications. Thus, it is necessary to customize operation of the operation display part. This problem is not a problem for the conventional compound machine in which external application can not be installed after shipment of the compound machine.

It can be considered to customize the operation display part by writing source code when developing the external application. That is, execution processing associated with touch operation of the display part is developed while developing the external application itself. In this case, from the view point of efficiency of development of the program, it is desirable to develop the external application while verifying the operation of the application in the compound machine. In this case, every time when there is a problem in the application, source code needs to be amended, recompiled, re-linked, and the application program needs to be installed in the compound machine again, then, the operation of the program needs to be verified again. According to this procedure, efficiency of development of the program is not good.

This problem is not limited to customizing of the operation display part. Generally, it is inefficient to produce a program by using a PC while verifying the program by using the compound machine. In addition, for executing an application, it is necessary to store the application in the compound machine from the PC in which the application is developed. Thus, in addition to developing an application efficiently, it is necessary to store and execute the application in the compound machine efficiently in order to improve the convenience of users.

SUMMARY OF THE INVENTION

An object of the present invention is provide an image forming apparatus and an information processing apparatus to improve efficiency for developing an application program and to improve efficiency for executing the application program.

The above object is achieved by an image forming apparatus, including:

a program obtaining part for sending a screen data for inputting a program to a client terminal, and receiving the program from the client terminal; and a program execution part for executing the program received by the program obtaining part.

According to the present invention, a program can be added or amended from an input screen of the client terminal, and the program can be executed without compiling. Thus, the operation of the program can be easily tested. Therefore, the program can be easily developed.

The above-object is also achieved by an information processing apparatus used for developing a program to be executed on an image forming apparatus, the information processing apparatus including:

an execution part for interpreting and executing the program;

an emulator for causing the information processing apparatus to perform processing corresponding to that to be performed by the image forming apparatus according to instructions of the program.

According to the present invention, since the emulator causes the information processing apparatus to emulate the image forming apparatus, the test of the program can be performed on the information processing apparatus, so that efficiency of development of the program improves.

The above-object is also achieved by an image forming apparatus that includes service modules for performing system side processing on image formation, wherein applications can be added to the image forming apparatus separately from the service modules, the image forming apparatus comprising:

a virtual machine for executing an application; and an application management part for managing the application executed by the virtual machine.

According to the present invention, an application executed on the virtual machine can be executed in the image forming apparatus. Generally, since the virtual machine absorbs differences of machine models, the application can be easily executed on the image forming apparatus.

In addition, according to the present invention, an information processing apparatus including a utility library that is implemented in a program is provided, wherein the program includes nested modules in which each module is based on a state transition model, wherein, in the state transition model, operation of the program is determined according to a first state of the program, an event for the program in the state, an event function to be executed when the event occurs in the state, and a second state transferred from the first state after the event function is executed, wherein the utility library includes a state transition model launch function that assigns areas each for a module to a shared variable shared by the modules.

According to the present invention, the shared variable shared among the modules can be used safely, and failure due to values of the variables can be prevented, so that the information processing apparatus operates stably.

BRIEF DESCRIPTION OF THE DRAWINGS

Other objects, features and advantages of the present invention will become more apparent from the following detailed description when read in conjunction with the accompanying drawings, in which:

FIG. 8 shows an example of the customize program according to the first embodiment;

FIG. 9 shows an example of the names of the customize programs stored in the customize directly;

FIG. 10 shows an example of the key association table;

FIG. 17 shows an example of the launch setting file 211 used in the third embodiment;

FIG. 18 shows an example of the button setting screen;

FIG. 21 shows an example of the launch setting file according to the fourth embodiment;

FIG. 24 shows an example of a VB application;

FIG. 25 shows an example of a VB application;

FIG. 26 shows a block diagram of the compound machine 1900 of the sixth embodiment;

FIG. 36 is a sample Java application;

FIG. 42 shows a list of Java application displayed by the loader;

FIG. 49 is an example of definition part of the source code of the external application;

FIG. 50 is an example of a function definition part in the source code of the external application;

DETAILED DESCRIPTION OF THE PREFERRED EMBODIMENTS

In the following, the image forming apparatus according to embodiments of the present invention will be described.

First Embodiment

Figure 1:
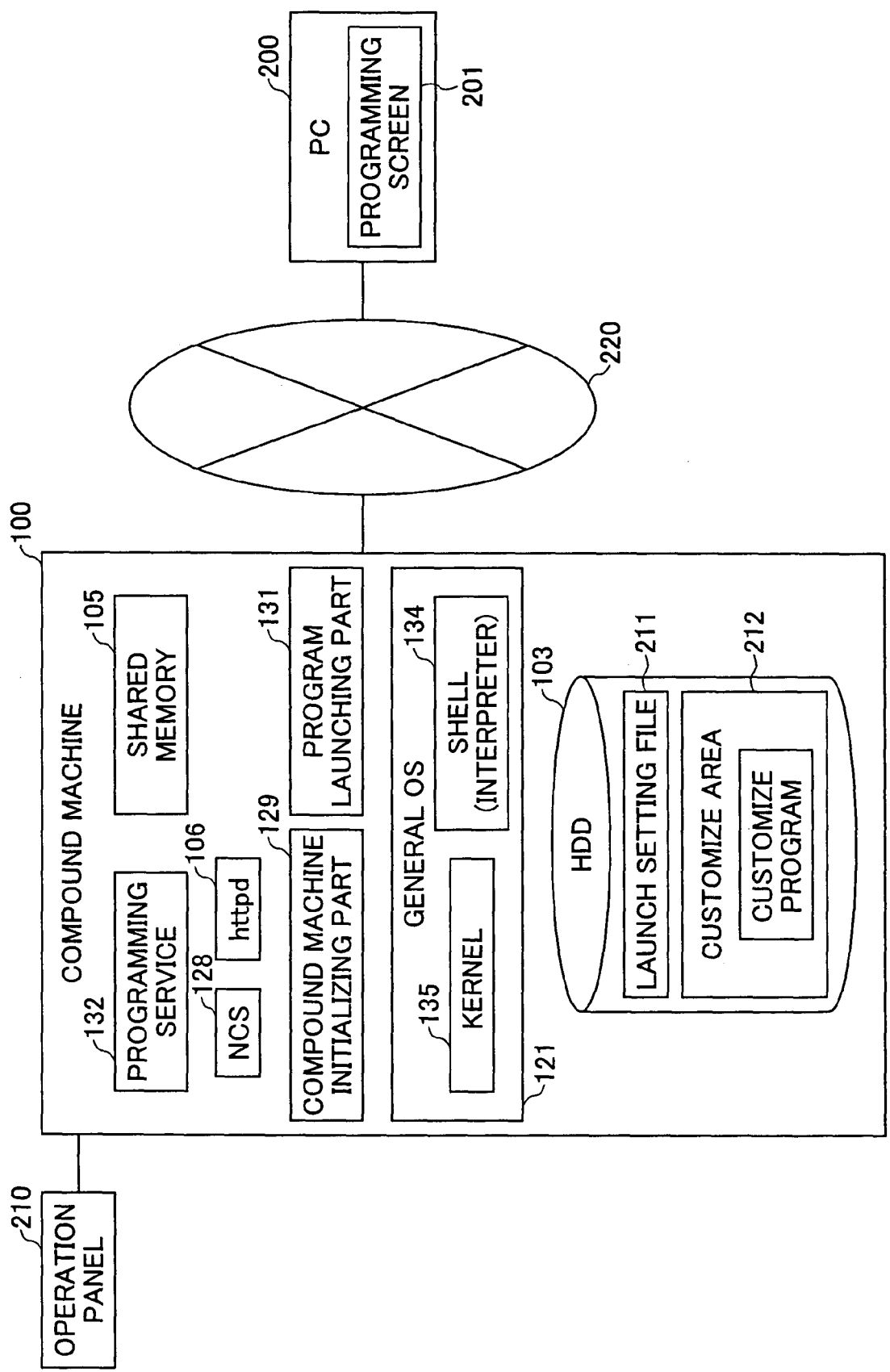
FIG. 1 is a block diagram showing a main configuration of the compound machine and the network configuration according to the first embodiment.

FIG. 1 is a block diagram showing a main configuration of the image forming apparatus (to be referred to as "compound machine" hereinafter) and a network configuration. The compound machine 100 of the first embodiment is connected to the Internet. In this configuration, a customize program for the compound machine can be input from a client terminal such as a PC (personal computer) connected to the Internet, and debugging of the program can be performed from the PC.

As shown in FIG. 1, the compound machine 100 and the PC 200 are connected by the Internet 220, in which TCP/IP is used for the communication protocol. The compound machine 100 includes a compound machine initializing part 129, a program launching part 131, a programming service 132, an interpreter 134, a NCS (network control service) 128, httpd (http daemon) 106, a shared memory 105 and a HDD 103.

The programming service 132 displays a programming screen 201 on a Web browser of the PC 200 and receives a customize program from the programming screen 201, in which the programming screen 201 is a Web page formed by a http file. In addition, the programming service 132 stores the customize program input from the PC in a customize directory 212 produced as a customize area of the HDD 103. In addition, the programming service 132 registers the customize program in the after-mentioned launch setting file 211 such that the customize program is executed on the compound machine 100.

The http file is transferred between the programming service 132 and the Web browser of the PC 200 according to a http protocol. Therefore, the programming service 132 has a function of a Web server (http server).

The customize program is written by using a language that can be interpreted by an interpreter. More specifically, the customize program is a shell script of UNIX.

The interpreter 134 interprets and executes the customize program step by step. In this embodiment, the interpreter 134 is the shell (bsh, csh and the like) that executes a shell script. The shell 134 is separated from the kernel 135 of the UNIX operating system.

The program launching part 131 launches the external application 117 installed in the HDD 103 if diagnosis result for the HDD 103 is normal. In addition, the program launching part 131 launches the external application stored in a recording medium such as an IC card.

The compound machine initializing part 129 is a process initially launched on the general OS 121. The compound machine initializing part 129 launches control services, applications 130 (excluding the external application) and the program launching part 131.

The NCS 128 controls communication via a network, and the NCS 128 notifies the programming service 132 that the NCS 128 has received a request message from the httpd 106.

The httpd 106 is a process (daemon) included in the operating system. The httpd 106 always monitors the port number 80 to receive a request message, and sends a response message. The structure of the request message and the response message is the same as that of a message of a normal http protocol, in which each message includes a message body described in a html format. The httpd 106 notifies the NCS 128 that the httpd 106 has received a request message from the Internet, and stores the request message in the shared memory 105.

The shared memory 105 is used for performing interprocess communication between the httpd 106 and the programming service 132. The request message and the response massage are sent and received via the shared memory.

The HDD 103 stores the launch setting file 211, and stores the customize program in the customize directory 212.

The PC 200 is a client terminal of the programming service that is a server. On the PC 200, the Web browser is running. The Web browser displays the programming screen 201 or other screens on a display of the PC 200, in which the programming screen 201 is sent from the programming service 132 by using the http protocol. On the Web browser, a user can input data.

Figure 2:
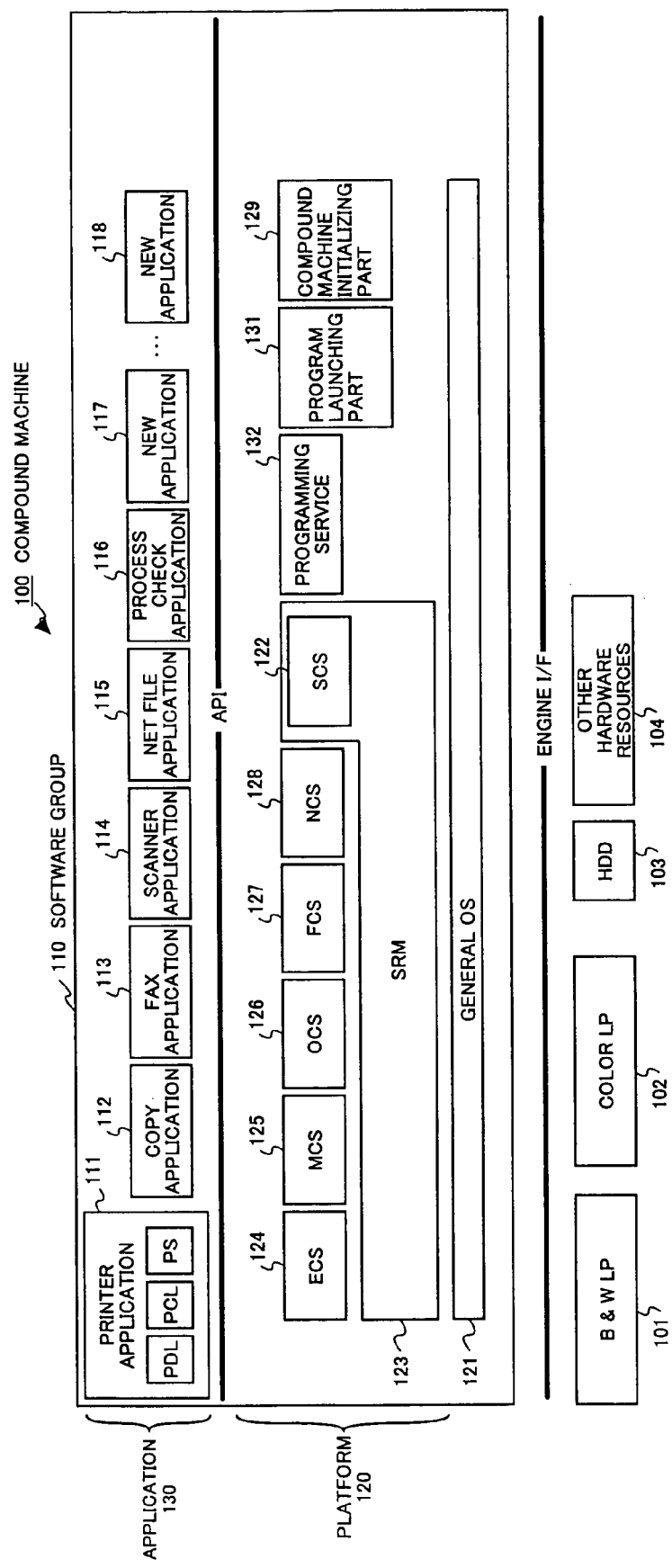
FIG. 2 is a block diagram of the compound machine 100 according to the first embodiment.

In the following, the functional configuration of the compound machine 100 of the present embodiment will be described. FIG. 2 is a block diagram of the compound machine 100. As shown in FIG. 2, the compound machine 100 includes hardware resources and a software group 110. The hardware resources include a black and white line printer (B&W LP) 101, a color laser printer 102, a hard disk drive 103, and other hardware resources 104 such as a scanner, a facsimile, a hard disk, memory (RAM, NV-RAM, ROM and the like) and a network interface. The software group 110 includes a platform 120, applications 130, the compound machine initializing part 129 and the program launching part 131 and the programming service 132.

The platform 120 includes control services for interpreting a process request from an application to issue acquiring requests to the hardware resources, a system resource manager (SRM) 123 for managing one or more hardware resources and arbitrating the acquiring requests from the control services, and a general-purpose OS 121.

The control services include a plurality of service modules, which are a system control service (SCS) 122, an engine control service (ECS) 124, a memory control service (MCS) 125, an operation panel control service (OCS) 126, a fax control service (FCS) 127, and a network control service (NCS) 128. The programming service 132 is included in the control service layer. In addition, the platform 120 has application program interfaces (API) that can receive process requests from the applications 130 by using predetermined functions.

The general purpose OS 121 is a general purpose operating system such as UNIX, and can execute each piece of software of the platform 120 and the applications 130 concurrently as a process.

The process of the SRM 123 is for performing control of the system and performing management of resources with the SCS 122. The process of the SRM 123 performs arbitration and execution control for requests from the upper layer that uses hardware resources including engines such as the scanner part and the printer part, the memory, the HDD file, the host I/Os (Centronics I/F, network I/F IEEE1394 I/F, RS232C I/F and the like).

More specifically, the SRM 123 determines whether the requested hardware resource is available (whether it is not used by another request), and, when the requested hardware resource is available, notifies the upper layer that the requested hardware resource is available. In addition, the SRM 123 performs scheduling for using hardware resources for the requests from the upper layer, and directly performs processes corresponding to the requests (for example, paper transfer and image forming by a printer engine, allocating memory area, file generation and the like).

The process of the SCS 122 performs application management, control of the operation part, display of system screen, LED display, resource management, and interrupt control for applications.

The process of the ECS 124 controls engines of hardware resources including the white and black line printer (B&W LP) 101, the color line printer (Color LP) 102, the scanner, and the facsimile and the like. The process of the MCS 125 obtains and releases an area of the image memory, uses the hard disk device (HDD), and compresses and expands image data.

The process of the FCS 127 provides APIs for sending and receiving of facsimile from each application layer by using PSTN/ISDN network, registering/referring of various kinds of facsimile data managed by BKM (backup SRAM), facsimile reading, facsimile receiving and printing, and mixed sending and receiving.

The NCS 128 is a process for providing services commonly used for applications that need network I/O. The NCS 128 distributes data received from the network by a protocol to a corresponding application, and acts as mediation between the application and the network when sending data to the network. More specifically, the process of the NCS 128 includes server daemon such as ftpd, httpd, lpd, snmpd, telnetd, smtpd, and client function of the protocols.

The process of the OCS 126 controls an operation panel that is a means for transferring information between the operator (user) and control parts of the machine. In the compound machine 100 of the embodiment, the OCS 126 includes an OCS process part and an OCS function library part. The OCS process part obtains an key event, which indicates that the key is pushed, from the operation panel, and sends a key event function corresponding to the key event to the SCS 122. The OCS function library registers drawing functions and other functions for controlling the operation panel, in which the drawing functions are used for outputting various images on the operation panel on the basis of a request from an application that has control right or from the control service. When the application is developed, functions in the OCS function library are linked to an object program that is generated by compiling a source code file of the application, so that an executable file of the application is generated. All of the OCS 126 can be configured as a process, or can be configured as an OCS library.

The application 130 includes a printer application 111 that is an application for a printer having page description language (PDL) and PCL and post script (PS), a copy application 112, a fax application 113 that is an application for facsimile, a scanner application 114 that is an application for a scanner, a network file application 115 and a process check application 116.

Interprocess communication is performed between a process of the application 130 and a process of the control service, in which a function is called, a returned value is sent, and a message is sent and received. By using the interprocess communication, user services for image forming processes such as copying, printing, scanning, and sending facsimile are realized.

As mentioned above, the compound machine 100 of the first embodiment includes a plurality of applications 130 and a plurality of control services, and each of those operates as a process. In each process, one or more threads are generated and the threads are executed in parallel. The control services provide common services to the applications 130. User services on image formation such as copying, printing, scanning and sending facsimile are provided while the processes are executed in parallel and the threads are executed in parallel, and interprocess communication is performed each other. A third party vendor can develop an external application for the compound machine 100, and can executes the application in an application layer on the control service layer in the compound machine 100.

In the compound machine 100 of the first embodiment, although processes of applications 130 and processes of control services operate, the application and the control service can be a single process. In addition, each application in the applications 130 can be added or deleted one by one.

In addition, the compound machine 100 includes an installer. The installer is used for installing the external application developed by the third party into the HDD 103. Then, the program launching part 131 launches the external application from the HDD 103. The preinstalled applications such as the printer application, control services, HDD diagnosing part 132, and the program launching part 131 are embedded in the flash memory. The preinstalled programs are launched by the compound machine initializing part 129 when the compound machine is powered on.

Figure 3:
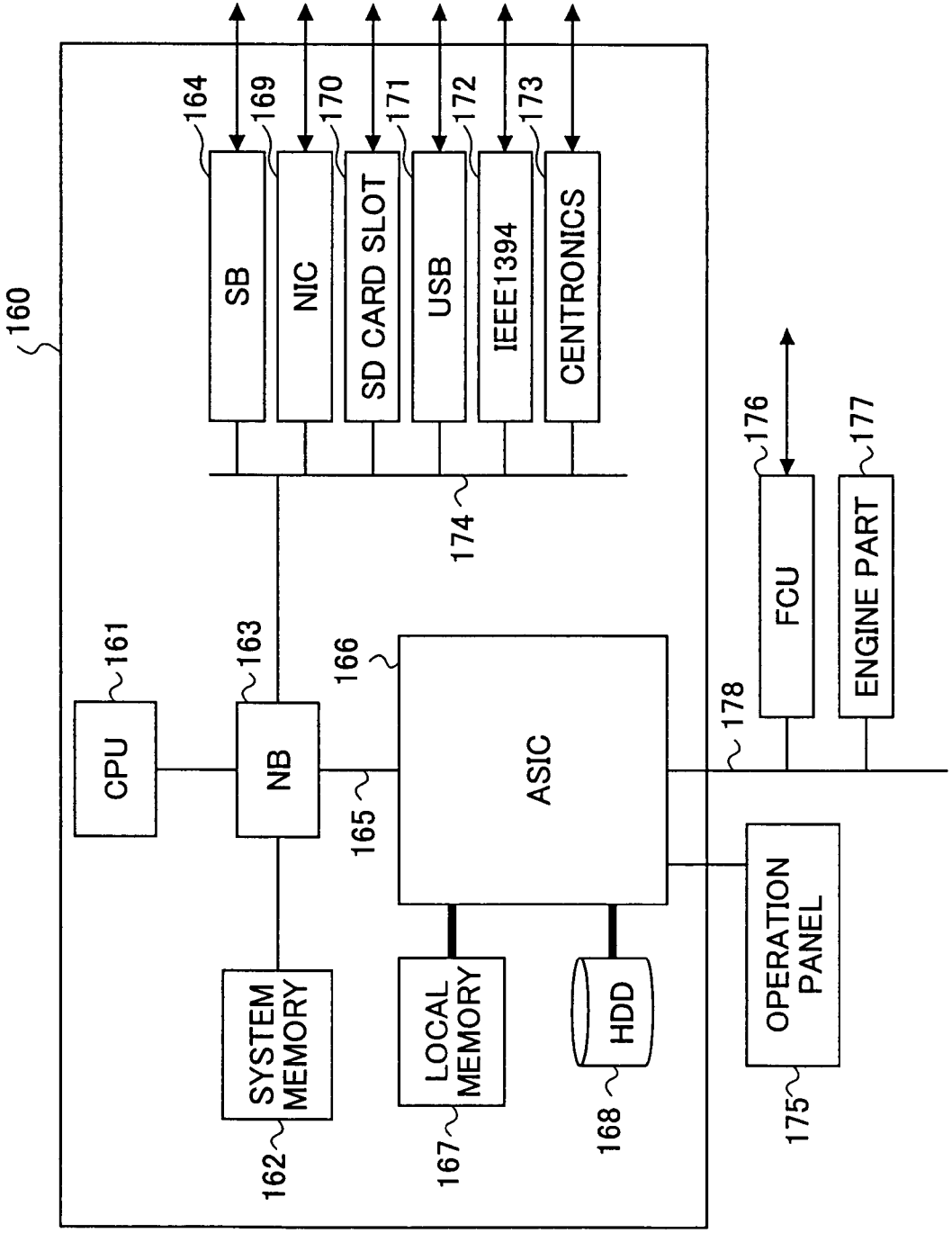
FIG. 3 shows an example the hardware configuration of the compound machine 100 according to the first embodiment.

FIG. 3 shows an example of the hardware configuration of the compound machine 100.

The compound machine 100 includes a controller 160, an operation panel 175, a fax control unit (FCU) 176, and an engine part 177 that is hardware resource such as a printer that is specific for image forming processing. The controller 160 includes CPU 161, a system memory 162, a north bridge (NB) 163, a south bridge (SB) 164, ASIC 166, a local memory 167, HDD 168, a network interface card (NIC) 169, a SD card slot 170, a USB device 171, an IEEE1394 device 172, and a Centronics 173. The memories 162, 167 may includes RAMs and/or ROMs, for example. The FCU 176 and the engine part 177 are connected to the ASIC 166 in the controller via a PCI bus 178. The CPU 161 executes programs of the application and control services and the like installed in the compound machine 100 by reading from a RAM.

In the following, the method of producing a program for the compound machine 100 will be described. First, the user launches the Web browser on the PC 200. Then, the user specifies a URL (for example, http://www.xxx.yyy/zzz/debug.htm) of the programming screen in the compound machine 100, so that the PC 200 accesses the programming service 132 of the compound machine 100. The programming service 132 accessed by the Web browser displays the programming screen 201 (debug.htm) on the Web browser of the PC 200.

Figure 7:
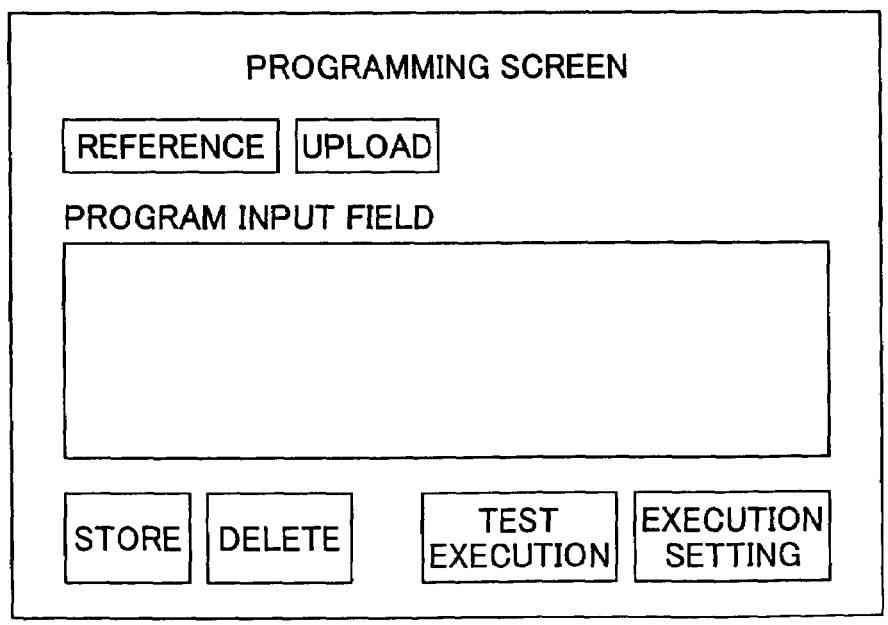
FIG. 7 shows an example of the programming screen 201.

FIG. 7 shows an example of the programming screen 201. As shown in FIG. 7, the programming screen 201 includes a program input field, a reference button, an upload button, a storing button, a delete button, a test execution button and an execution setting button.

The programming screen 201 is a file (debug.htm) written in a html format. The Web browser reads the file so that the programming screen 201 is displayed on the PC 200. The programming service 132 executes a script of CGI to perform processing in response to operation input from the programming screen. In addition, the programming service 132 reflects the result of the processing to the programming screen and returns the result to the Web browser of the PC 200.

More specifically, when the programming service 132 receives a request (such as a click operation) for inputting the customize program, the programming service 132 executes debug.cgi script. Although the programming service performs various processing by executing the CGI script in the present embodiment, the various processing can be also performed by using other programs called by the CGI script. In addition, the programming screen can be written in a XML (extensible Markup Language) format.

The reference button is a button for referring to the customize program stored in a memory area of the PC 200. By pushing the reference button, directories of the PC 200 are displayed. If the user specifies a customize program in a directory, the file name of the customize program is displayed in the file name field. When the reference button is pushed, the PC 200 may refer to a directory in a recording area of the compound machine such as the HDD 103.

By clicking the upload button, the customize program is uploaded to the compound machine 100. The program input field is a field for inputting the customize program. In the program input field, the customize program can be input directly into the PC 200 by using an input device such as a keyboard of the PC 200. In addition, by specifying a program file existing in a directory by clicking the reference button, the customize program can be input. In the debug.htm, in the head of every line corresponding to the program input field, a string "program_list:" is described.

After uploading the customize program, by clicking the storing button, the customize program is stored in the customize directory. By clicking the delete button, the customize program input in the input field is deleted.

The execution setting button is used for associating the customize program with a button, such that the customize program stored in the customize directory can be executed in the compound machine 100 by pushing the button. If the execution setting button is pushed, the programming service 132 searches buttons in a file in the customize directory for a button specified in the customize program by using a key code, so that the customize program is associated with the button. Then, a table in which the name of the customize program and the key code of the button are associated with each other is generated, and the table is stored in the HDD 103 or in the flash memory.

The test execution button is used for executing the customize program experimentally.

FIG. 8 shows an example of the customize program. As shown in FIG. 8, the customize is a shell script of the UNIX according to the present embodiment. The input shell script is executed step by step by the shell 134 that is a command interpreter of the UNIX. Thus, it is not necessary to compiling and linking the customize program.

In addition, in the shell script, commands specific for the compound machine can be used. The commands are provided by a development library for the compound machine. The script shown in FIG. 8 shows an example for reading a document by using a scanner (scanimage), decompressing image data that is compressed to TIFF format (decomp), and performing character recognition process for the decompressed image data (ocr). Then, the recognition result is sent by e-mail as text data (mail). In this script, the commands "scanimage", "decomp", and "ocr" are provided by the development library. A button (key) for executing the shell script can be specified in the customize program.

In the programming screen (debug.htm) displayed on the Web browser of the PC 200, when the customize program stored in the PC 200 is specified by clicking the reference button or when the customize program is directly input in the program input field, and the upload button is clicked, a request message is sent to the programming service 132 of the compound machine from the Web browser. "debug.htm" is included in the message body of the request message, and the debug.htm includes a description for calling debug.cgi. Thus, when receiving the request message, the programming service 132 analyzes the request message and executes the debug.cgi.

Figure 4:
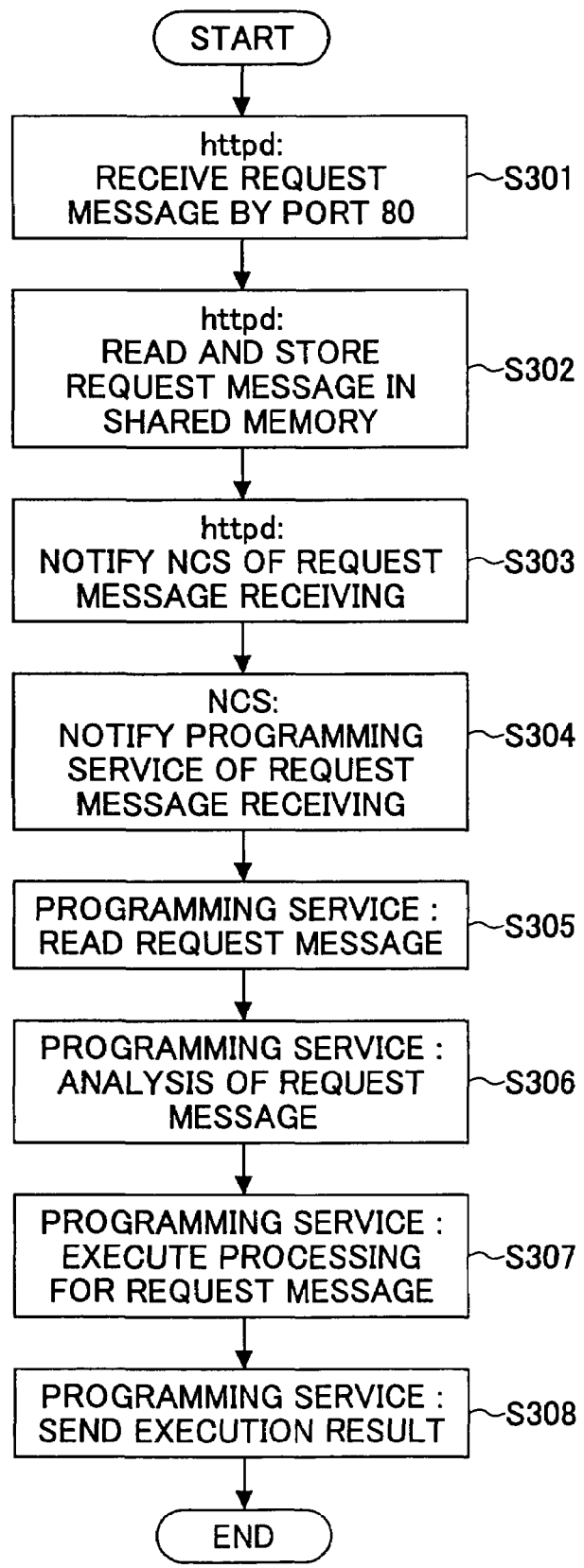
FIG. 4 shows a flowchart showing a process procedure in the compound machine that receives the request message.

In the following, the process procedure in the compound machine 100 that received the request message will be described. FIG. 4 shows a flowchart showing the procedure.

The httpd 106 always monitors port 80, and receives the request message via the port 80 from the PC 200 in step S301. Then, the httpd 106 reads the received request message, and writes the request message in the shared memory 105 in step S302. Next, httpd 106 notifies the NCS 120 that the the httpd received the request massage in step S303.

The NCS 128 notifies the programming service 132 that the NCS 128 received the request message in step S304. The notification triggers the programming service 132 to refer to the shard memory 105 and reads the request message in step S305. Then, the programming service 132 analyzes the information in the request message in step S305, and executes processing according to the information described in the message body of the request message in step S307. If the message body of the html description includes information instructing to execute a CGI program, the corresponding CGI is executed.

Then, the programming service 132 returns the execution result to the PC 200 as a response message via httpd 106 in step S308.

Figure 5:
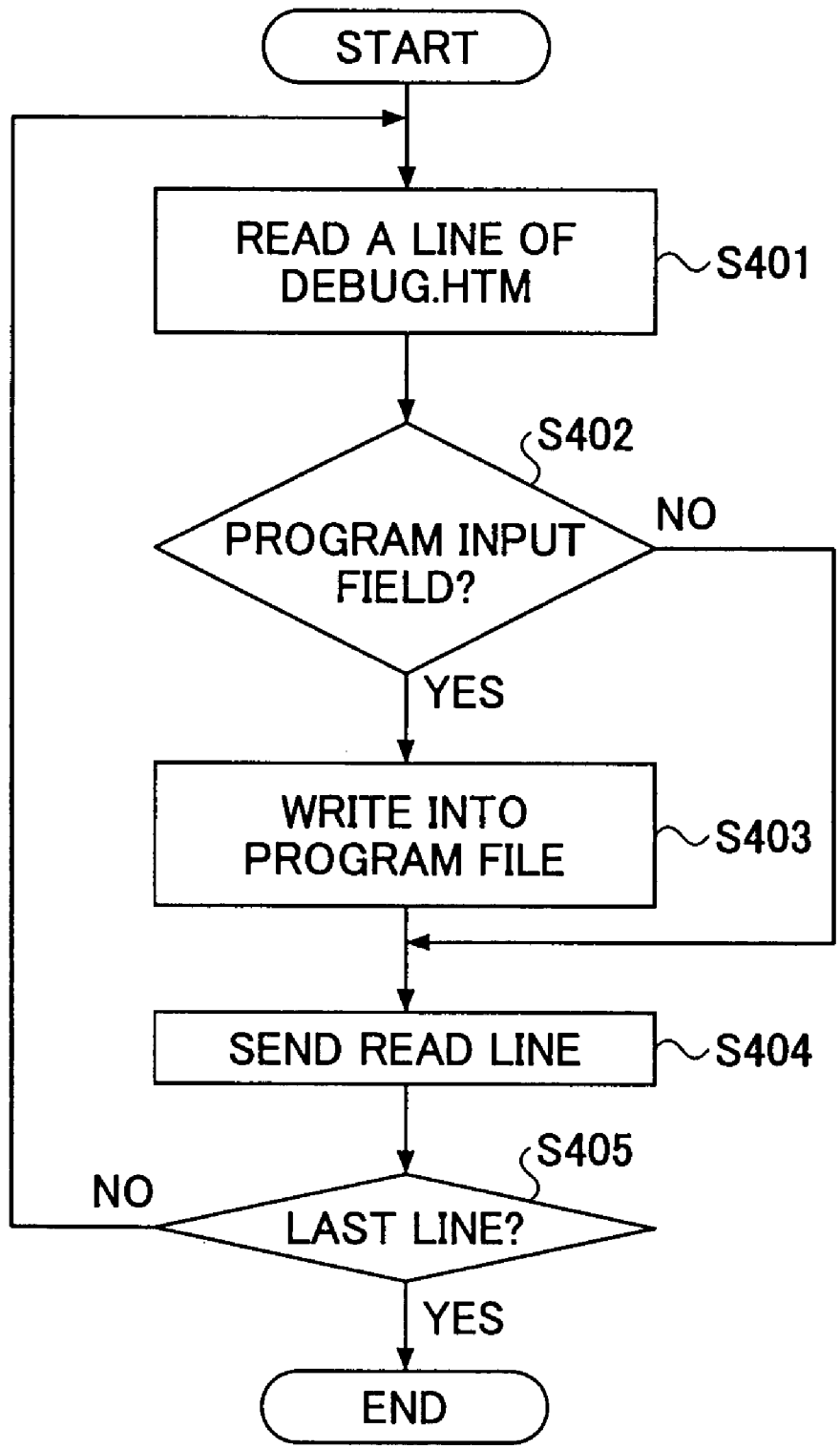
FIG. 5 is a flowchart showing the operation by debug.cgi.

Next, processing of debug.cgi performed by the programming service 132 will be described. FIG. 5 is a flowchart showing the operation of the debug.cgi. The programming service 132 may include the program debug.cgi, or the debug.cgi may exist in the outside of the programming service 132. In the following, the case where the programming service 132 includes the debug.cgi.

The programming service 132 reads debug.htm line by line from the top in step S401. Then, the programming service determines whether the line indicates the program input field by checking whether the line includes a string "program_list:" in step S402.

If the programming service 132 determines that the line indicates the program input field, the programming service 132 writes the line in a program file in step S403, and sends the line to the PC 200 in step S404.

The programming service determines whether the line is the last line in step S405. If the line is the last line, the processing ends. If the line is not the last line, the above-mentioned processing is performed for the next line. Accordingly, the program file is generated and the program is displayed on the Web browser of the PC 200.

In addition to the above-mentioned method, there are various methods to send a program input into the PC 200 to the compound machine. For example, by pushing the upload button, the PC 200 stores the input program in a program file and sends the program file to the compound machine. The compound machine stores the program file in an area and sends the contents in the program file to the PC 200 as necessary.

As mentioned above, the customize program input from the programming screen 201 is uploaded in the compound machine 100, and the customize program that is uploaded is displayed. After that, the storing button, execution setting button, and the test execution button becomes operable. When a button in the buttons is clicked, the programming service 132 performs following processes.

Figure 6:
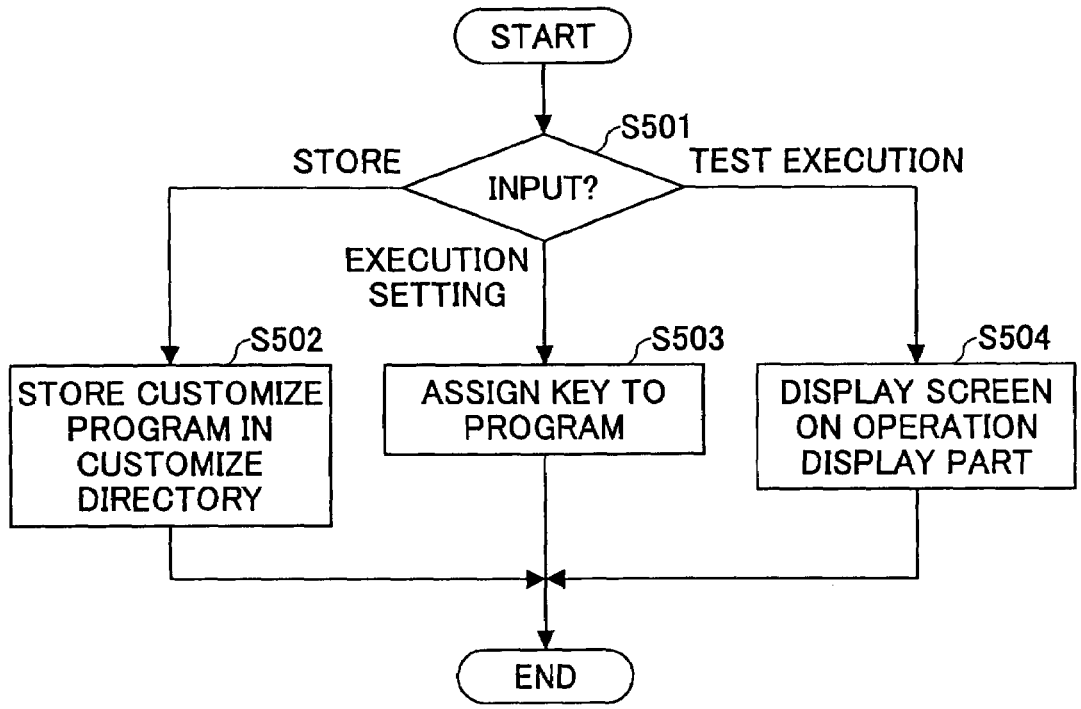
FIG. 6 is a flowchart showing an operation of the programming service 132 when one of the storing button, execution setting button and test execution button is clicked in the programming screen 201.

FIG. 6 is a flowchart showing an operation of the programming service 132 when one of the storing button, execution setting button and test execution button is clicked in the programming screen 201. This processing is written by Java Script as a CGI script in the programming service 132. The PC 200 detects button operation on the programming screen 201 as an event, and the PC 200 sends the event to the programming service. The programming service 132 executes a Java script according to the event. In the following, the case where the Java script is included in the programming service 132.

The programming service 132 determines the type of the button that is clicked in step S501. When the storing button is clicked on the programming screen 201, the programming service 132 stores the customize program in a customize directory of the HDD 103 of the compound machine 100 by using a name specified by the usr in step S502.

FIG. 9 shows an example of the name of the customize program stored in the customize directly. As shown in FIG. 9, the directory of the HDD 103 is hdd/xxx/opepane in which the customize programs shell1, shell2, and shell3 are stored.

When the execution setting button is pushed on the programming screen 201, the programming service 132 associates the customize program with the button in step S503.

FIG. 10 shows an example of the key association table. As shown in FIG. 10, key codes of buttons are associated with customize program names. When the test execution button is pushed at the programming screen, the programming service 132 executes the customize program in step S504. This test execution is realized by issuing a command for executing the customize program by the shell. At this time, a screen same as that displayed on the operation panel 210 is displayed on the browser in the PC 200. This is realized in the following way, for example. The programming service 132 obtains drawing instructions issued by executing the customize program for the operation panel screen, and sends instructions to the PC 200 such that a screen same as the screen that appears on the operation panel by the drawing instructions is displayed on the PC 200.

If an error occurs by the test execution, the user amends the program on the PC 200, uploads the amended program and executes the program again.

Figure 11:
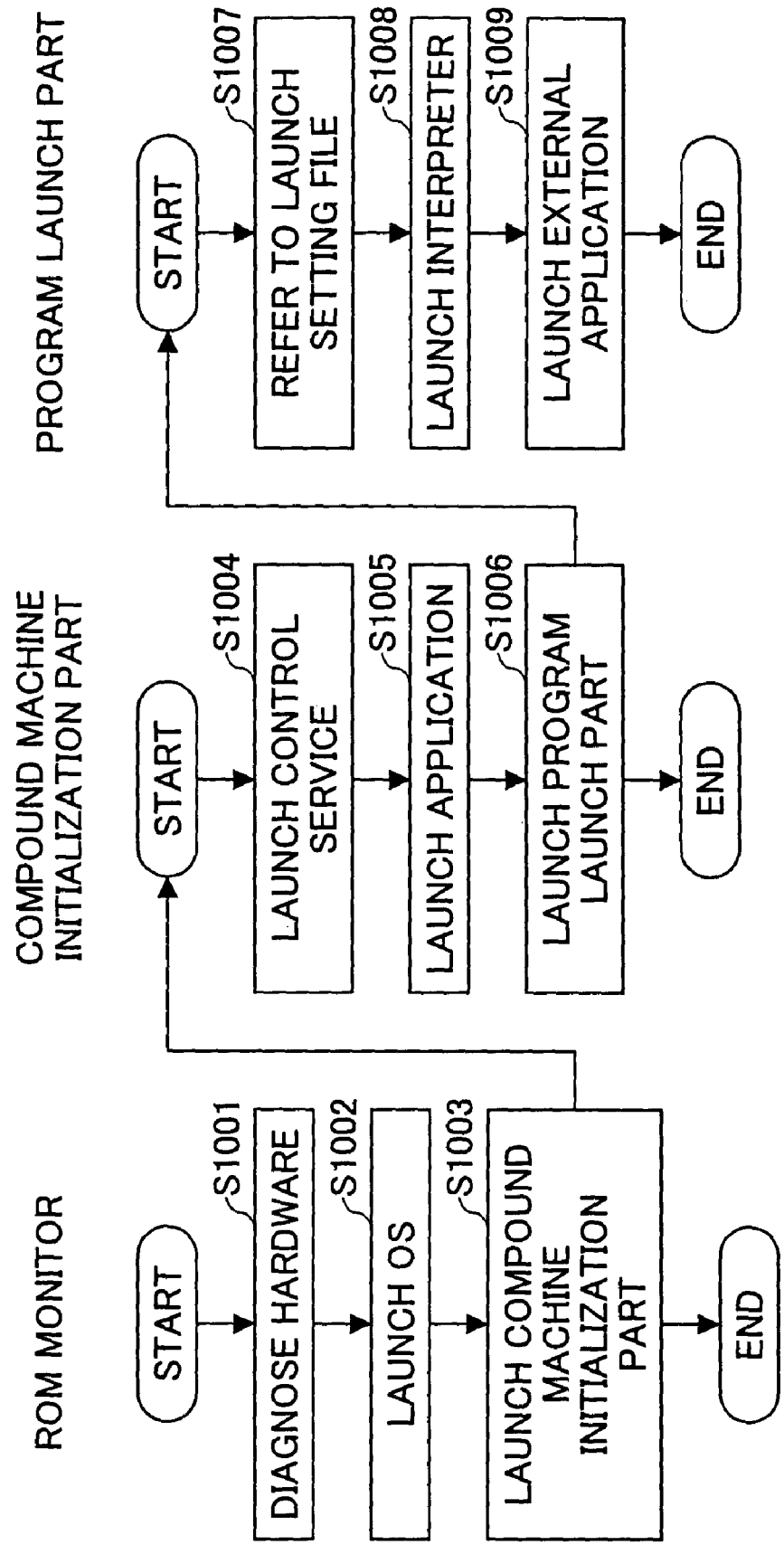
FIG. 11 shows a flowchart showing a procedure from power on of the compound machine 100 to the execution of the customize program.

Next, processing for executing the customize program generated in the above-mentioned way will be described. FIG. 11 shows a flowchart showing a procedure from power on of the compound machine 100 to the execution of the customize program.

After the customize program is stored in the customize directory and the launch setting file 211 is set, the user turns on the power of the compound machine 100. The compound machine 100 diagnoses the hardware by using the ROM monitor in step S1001. After that, the general OS 121 is launched in step S1002, and the compound machine initialization part 129 is launched in step S1003. The compound machine initialization part 129 launches the control services in step S1004, and launches existing applications such as the copy application 112, printer application 111 and the like that are already included at the time of shipment of the compound machine in step S1005. Then, the program launch part 131 is launched for launching an external application developed after the shipment of the compound machine in step S1006.

The program launch part 131 refers to the launch setting file 211 of the HDD 103 in step S1007 to obtain the name of the program to be executed.

Figures 12, 13:
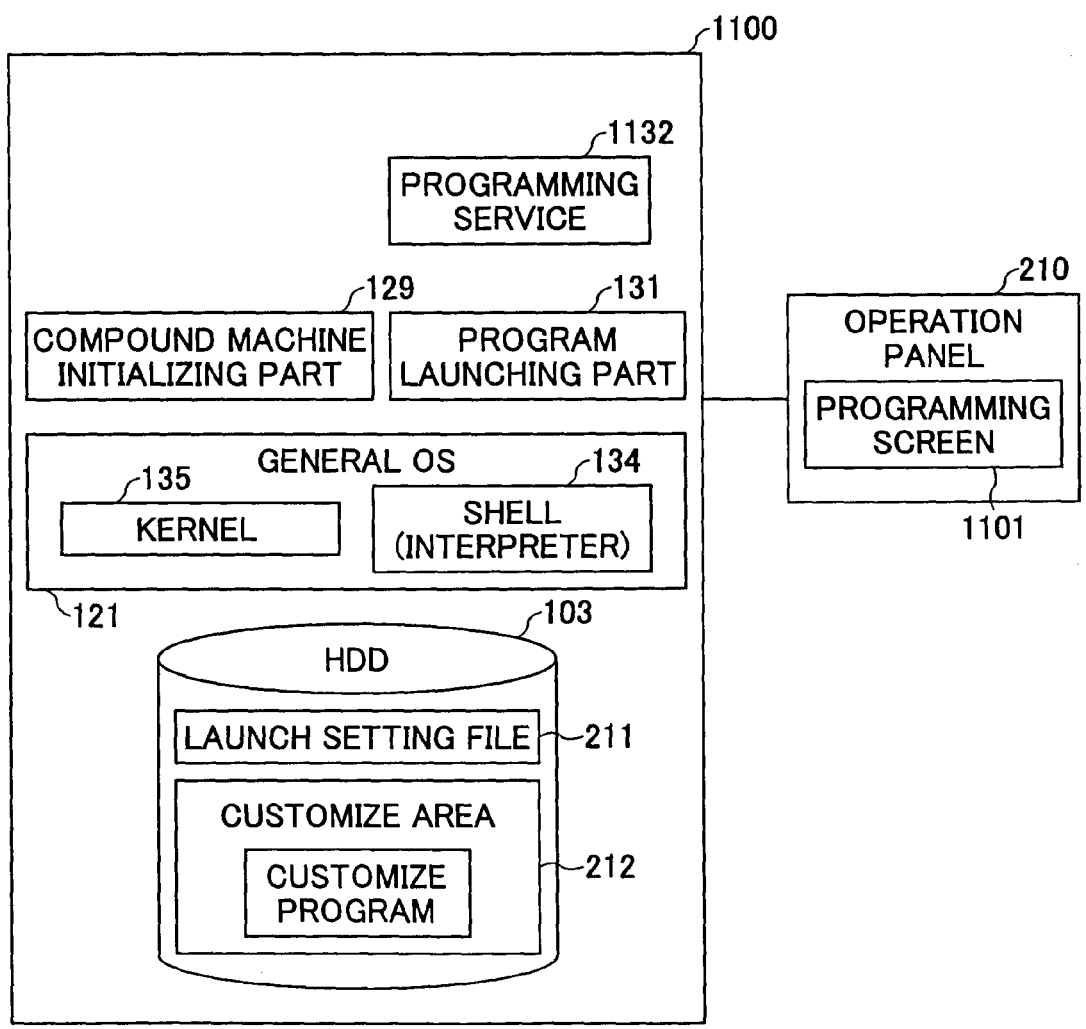
FIG. 12 is an example of the launch setting file 211.
FIG. 13 is a block diagram showing the main configuration of the compound machine of the second embodiment.

FIG. 12 is an example of the launch setting file 211. As shown in FIG. 11, in the launch setting file 211, a program to be launched by the program launch part 131 is registered as "program name, customize program name". In the example shown in FIG. 12, the shell program of a shell script is registered first, and after that, xxx application is registered as an external application.

When the user pushes (touches) the button (key) associated with the customize program among buttons displayed on the operation display part in the operation panel 210, the customize program which is a shell script is executed by the shell. More specifically, the programming service 132 obtains pushed information of the button, and refers to the key association table, so that the programming service 132 obtains a file name of the customize program corresponding to the button. Then, the programming service 132 executes the customize program. The customize program can be also executed by setting the name of the customize program in the launch setting file.

As mentioned above, according to the compound machine of the first embodiment, the programming service 132 causes the PC 200 to display the programming screen to input the customize program. Then, the shell 134 executes the customize program. Accordingly, in the development of the customize program, the customize program can be added or amended from the programming screen, and the customize program can be executed on the compound machine without compiling and linking. Therefore, the program can be produced easily.

In addition, according to the compound machine of the first embodiment, since the input of the customize program can be performed from the PC 200, the customize program can be produced efficiently compared with inputting the customize program from the compound machine 100.

In the first embodiment, the Internet 220 is used for connecting PC 200 and the compound machine. Instead of the Internet, LAN can be used. In addition, other protocols other than the TCP/IP can be used.

In addition, the PC 200 may have a program for displaying the programming screen and sending the customize program instead of receiving the debug.htm file from the compound machine.

Second Embodiment

In the first embodiment, the customize program is produced in the PC 200 and the program is stored in the compound machine 100. On the other hand, the customize program is input from the operation panel of the compound machine in the second embodiment.

FIG. 13 is a block diagram showing the main configuration of the compound machine of the second embodiment. The other configuration of the compound machine is the same as that of the compound machine of the first embodiment shown in FIG. 2. As shown in FIG. 13, the compound machine 1100 of the present embodiment includes a programming service 1132, an interpreter (shell) 134 and the HDD 103.

The programming service 1132 displays a programming screen on the operation display part of the operation panel 210. The user can input a customize program from the programming screen. In addition, the programming service 1132 stores the input customize program in a customize directory 212, in which the customize directory 212 is a customize area of the HDD 103. In addition, the programming service 1132 registers the customize program in the launch setting file such that the customize program can be executed on the compound machine 1100.

Capabilities of the compound machine initialization part 129, the program launch part 131, the launch setting file 211 and the customize directory are the same as those of the compound machine 100.

Figure 14:
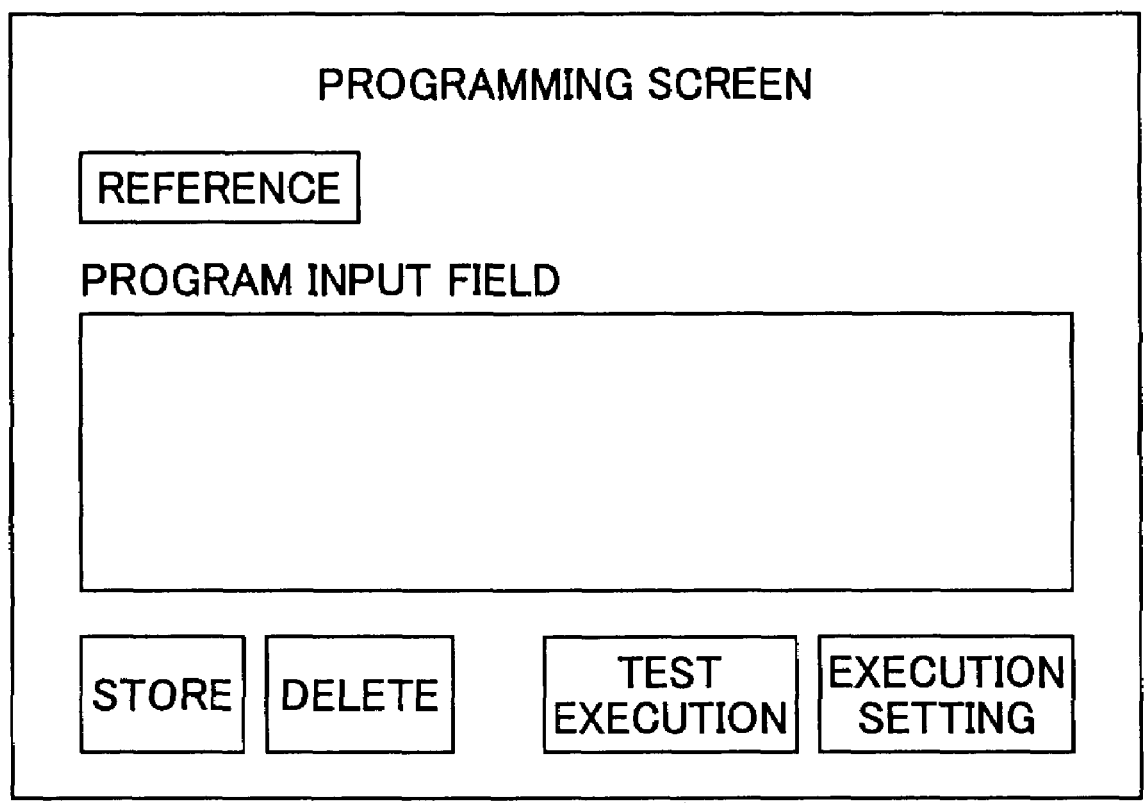
FIG. 14 shows an example of the programming screen 1101 of the second embodiment.

FIG. 14 shows an example of the programming screen 1101. The programming screen is displayed from the system initialization setting screen by selecting a tag of "programming".

Like the corresponding screen of the first embodiment, the programming screen 110 shows the input field, the reference button, the storing button, the execution setting button and the test execution button. On the programming screen 1101, a software keyboard is displayed on the operation display part. By using the software keyboard, the customize program can be input from the input field.

However, it is difficult to directly input the customize program since the area size of the operation display part is small and data input from the operation display part is not easy. Therefore, it is desirable to store the customize program in an area of a recording medium such as the HDD 103 via network and to perform only easy modification of the customize program by using the software keyboard. That is, by selecting the customize program by pushing the reference button on the programming screen 1101, the customize program is displayed in the input field. Then, the user can modify the customize program by displaying the software keyboard.

After the development of the customize program is completed, the storing button is pushed. Accordingly, like the first embodiment, the programming service 1132 stores the customize program in the customize directory of the HDD 103. In addition, like the first embodiment, by pushing the execution setting button, the programming service 1132 associates the customize program and a key code of a button (key) specified by the customize program, and stores a table indicating the association. Execution processing of the produced customize program is the same as that of the first embodiment.

As mentioned above, according to the compound machine 1100 of the second embodiment, the programming screen 1101 is displayed on the operation display part of the operation panel 210, and the customize program can be input from the screen. Thus, by using the standalone compound machine 1100 that is not connected to the network, the customize program can be produced.

Third Embodiment

According to the compound machine of the first and second embodiments, the customize program associates the customize program with a button (key) of the operation display part by using a description in the customize program. According to the third embodiment, correspondence between the customize program and the button (key) is dynamically established at the time when the compound machine is powered on.

Figure 15:
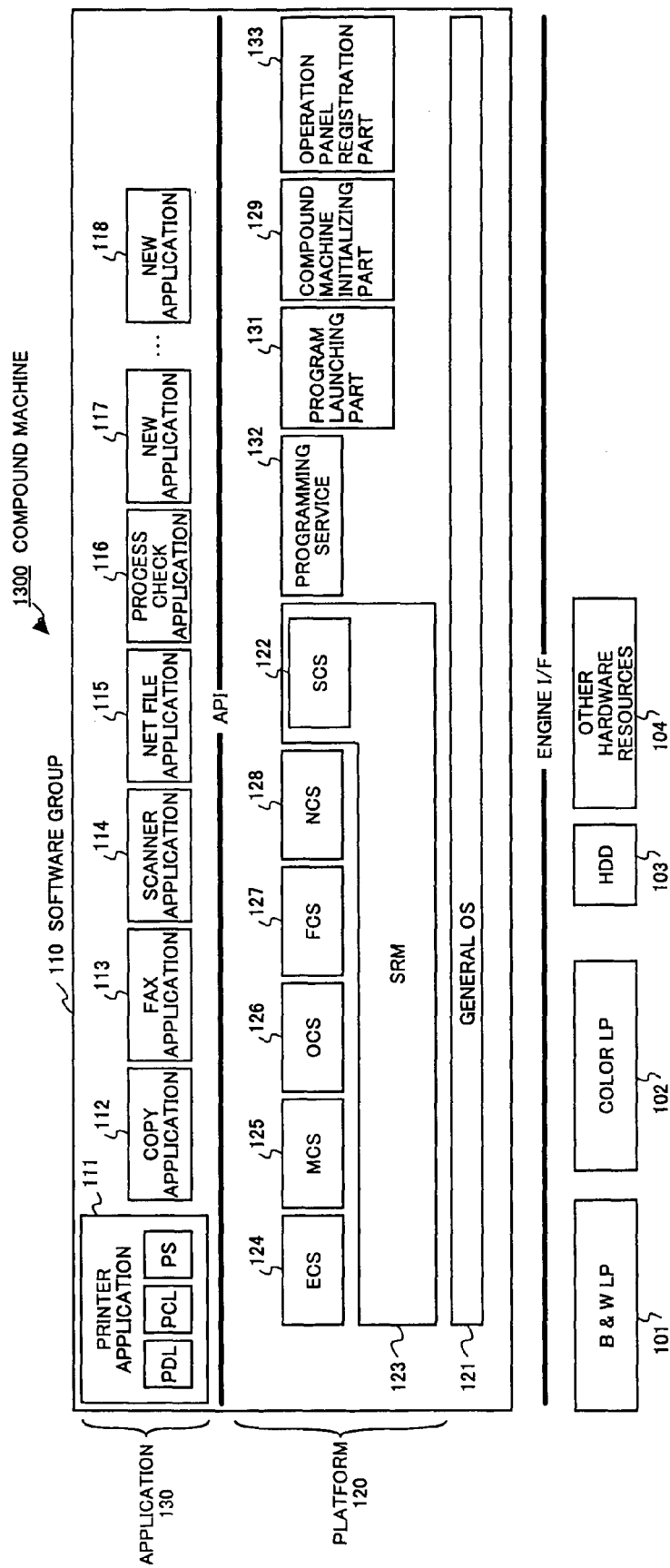
FIG. 15 is a block diagram showing the functional configuration of the compound machine 1300 according to the third embodiment.

FIG. 15 is a block diagram showing the functional configuration of the compound machine 1300. In the same way as the first embodiment, the customize program of a shell script is produced in the PC 200, and the customize program is stored in the HDD 103 and executed by the compound machine 1300.

As shown in FIG. 15, the configuration of the compound machine of this embodiment is different from that of the first embodiment in that the compound machine 1300 has an operation panel registration part 133.

The operation panel registration part 133 assigns a button (key) to the customize program for executing the customize program. That is, by pushing (touching) a button assigned by the operation panel registration part 133, the customize program is executed.

The procedure for producing and storing the customize program of this embodiment is the same as that of the first embodiment. In the following, the method for assigning the button to the customize program will be described. The user turns on the power of the compound machine 100 again after the customize program is stored in the customize directory in order to assigning the customize program to a button (key).

Figure 16:
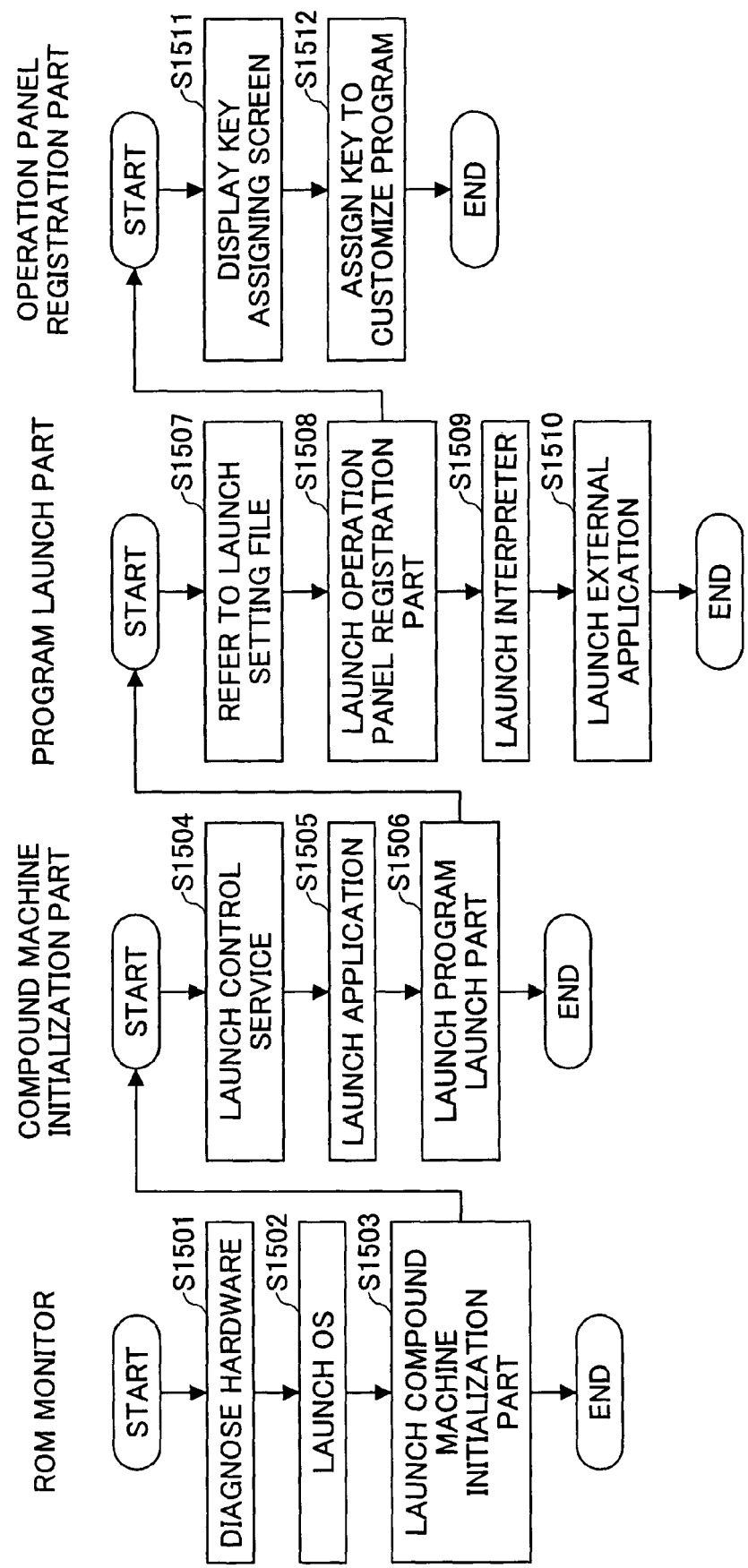
FIG. 16 is a flowchart showing a procedure from power on of the compound machine 1300 to the completion of assigning the button.

FIG. 16 is a flowchart showing a procedure from power on of the compound machine 1300 to the completion of assigning the button. The steps from power on to the launch of the program launch part 131 (steps S1501-S1506) are the same as the corresponding steps of the compound machine of the first embodiment.

The launched program launch part 131 refers to the launch setting file 211 in the HDD 103 in step S1507, and obtains a name of a program to be launched. FIG. 17 shows an example of the launch setting file 211 used in this embodiment. In this example, a program of the operation panel registration part, the shell and an external application (xxx application) are set as programs to be launched.

Therefore, the program launch part 131 launches the program of the operation panel registration part 133 first in step S1508. The program of the operation panel registration part 133 is stored in the customize directory beforehand. Next, the interpreter (shell) 134 is launched in step S1509. Finally, the external application is launched in step S1510.

The launched operation panel registration part 133 displays a setting screen for key assignment on the operation panel in step S1511. FIG. 18 shows an example of the setting screen. As shown in FIG. 18, buttons that can be assigned are displayed for each customize program on the setting screen. When the user pushes a button for a customize program, the operation panel registration part 133 associates the button with the customize program, and stores the association information in a recording medium such as the HDD 103 or a flash memory as a table in step S1512. Accordingly, the button is assigned to the customize program.

As mentioned above, according to the compound machine of the third embodiment, the programming service 132 displays the programming screen 201, so that the user inputs the customize program. Then, the operation panel registration part 133 assigns a button (key) to the customize program. By launching the operation panel registration part 133 when the compound machine 1300 is powered on, a button for launching the customize program can be dynamically determined at the time when the compound machine 1300 is launched.

Although the operation panel registration part assigns the button to the customize program in this embodiment, a control service such as the SCS 122 also can assign a button to the customize program. By using the SCS 122 for the assignment, a program for the operation panel registration part 133 is not necessary and the processing becomes efficient.

Fourth Embodiment

According to the compound machines 100, 1100 and 1300 of the first to third embodiment, the customize program is executed by the shell 134 which is a command interpreter of UNIX. On the other hand, according to the fourth embodiment, the customize program is executed by using an interpreter other than the shell 134.

Figure 19:
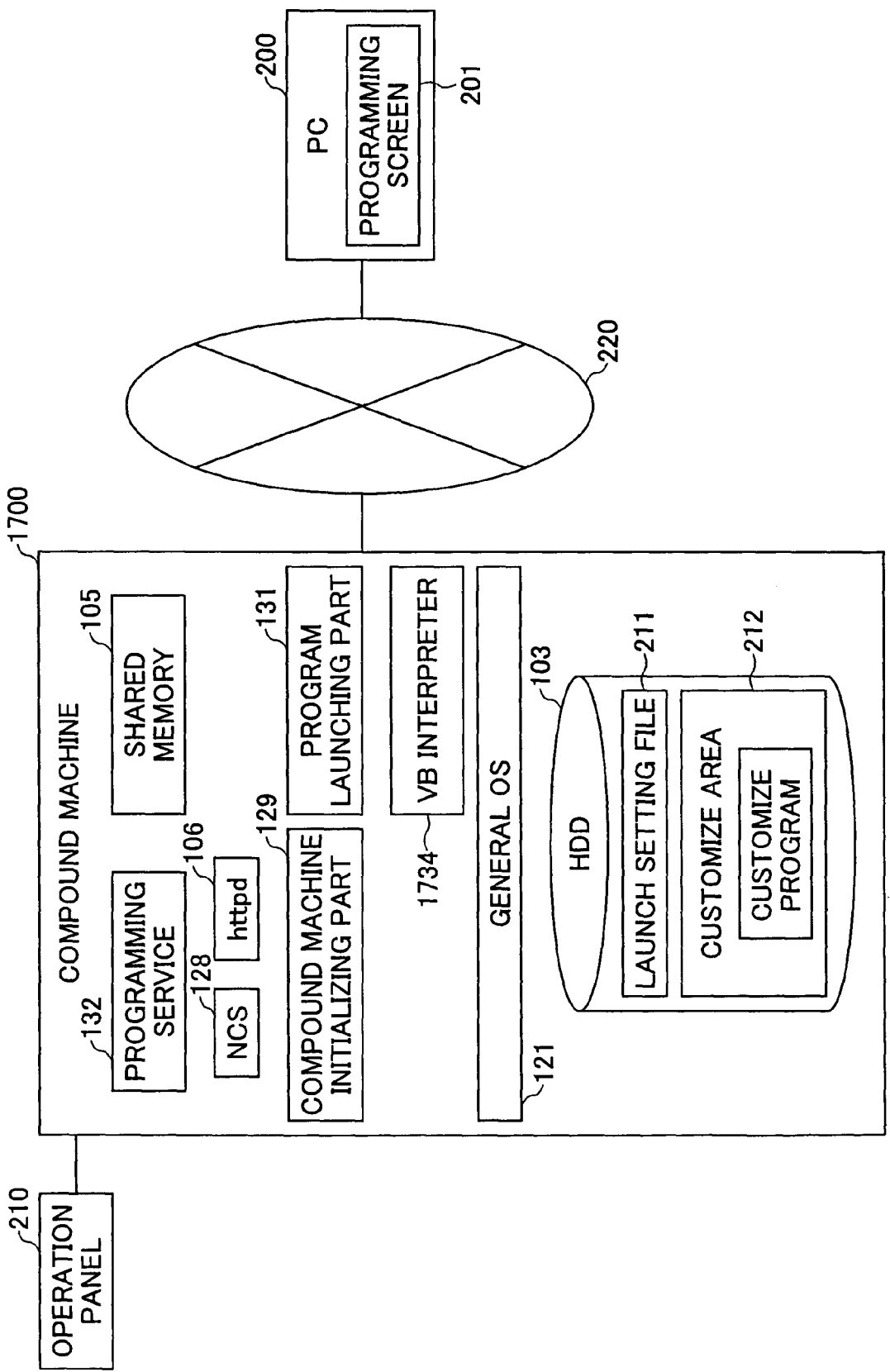
FIG. 19 shows a network configuration including a compound machine 1700 of the fourth embodiment.
Figure 20:
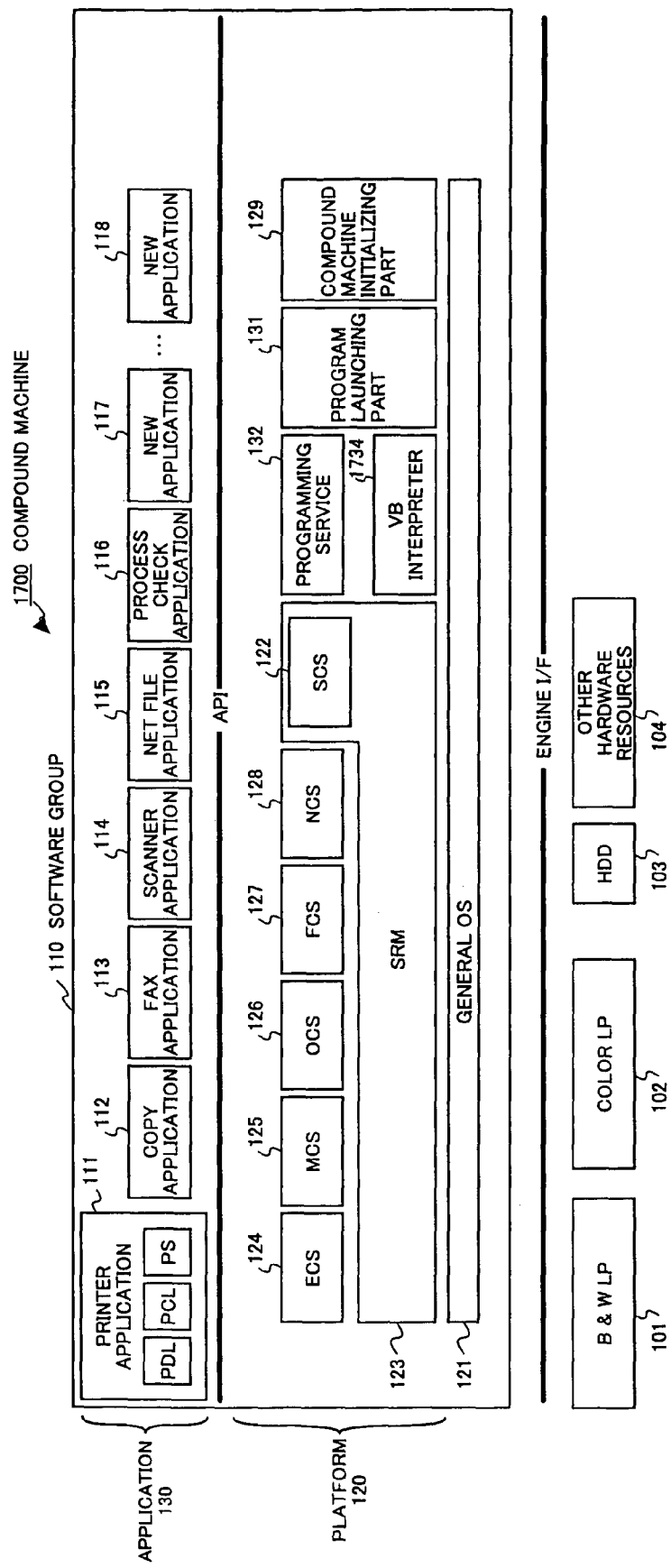
FIG. 20 shows a block diagram showing a functional configuration of the compound machine 1700.

FIG. 19 shows a network configuration including a compound machine 1700 of the fourth embodiment. FIG. 20 shows a block diagram showing a functional configuration of the compound machine 1700. Like the first embodiment, the compound machine 1700 is connected to the Internet in addition, the customize program can be input and can be debugged from the PC 200 that is a client terminal connected to the Internet. As an example of the customize program, there is a program in which buttons are displayed on the operation display part, when a button is pushed, processing corresponding to the button is executed.

According to the compound machine 1700 of the present embodiment, the customize program is written by using the Visual Basis language. Then, the customize program is executed by using the Visual Basis interpreter.

As shown in FIG. 19, the compound machine includes the compound machine initializing part 129, the program launching part 131, the programming service 132, the Visual Basis interpreter 1734 (referred to as VB interpreter 1734 hereinafter), the NCS 128, the httpd 106, the shared memory 105 and the HDD 103. Capabilities of the compound machine initializing part 129, the program launching part 131, the programming service 132, the NCS 128 and the httpd 106 are the same as those of the first embodiment. In addition, the contents in the launch setting file 211 stored in the HDD 103 and the customize directory are the same as hose of the first embodiment.

The VB interpreter 1734 interprets and executes the customize program step by step. Producing and storing the customize program in this embodiment are performed in the same way as the first embodiment.

In the compound machine 1700, it is necessary to launch the VB interpreter 1734 to execute the customize program. Therefore, the launch setting file 211 includes the program name of the VB interpreter 1734.

FIG. 21 shows an example of the launch setting file. As shown in FIG. 21, "VB interpreter" is set in the first line of the launch setting file 211. Thus, the program launch part 131 launches the VB interpreter 1734 by referring to the launch setting file 211. Accordingly, the customize program can be executed.

According to the compound machine of the fourth embodiment, the customize program can be executed by the VB interpreter that runs under the general OS 121, the customize program can realize more advanced features compared with the program runs under the shell. Thus, advanced program can be easily produced.

In the fourth embodiment, the PC 200 may include a Visual Basis development environment including the VB interpreter. By including the Visual Basis development environment in the PC 200, the development of the customize program, including designing LCD panel screen, can be performed on the PC 200. Then, the developed program can be sent to the compound machine, for example, by using a file transfer protocol, so that the program is stored in the compound machine.

Other than the Visual Basic, other interpreter language can be used. For example, Java can be used. In the first to fourth embodiments, the programming service 132 can be included in the application layer instead in the control service layer.

Fifth Embodiment

The compound machine of the fourth embodiment executes the customize program by using an interpreter operating under the general OS 121. According to the compound machine 1800 of the fifth embodiment, the VB interpreter 1801 and the VB application 1802 are included in the application layer.

Figure 22:
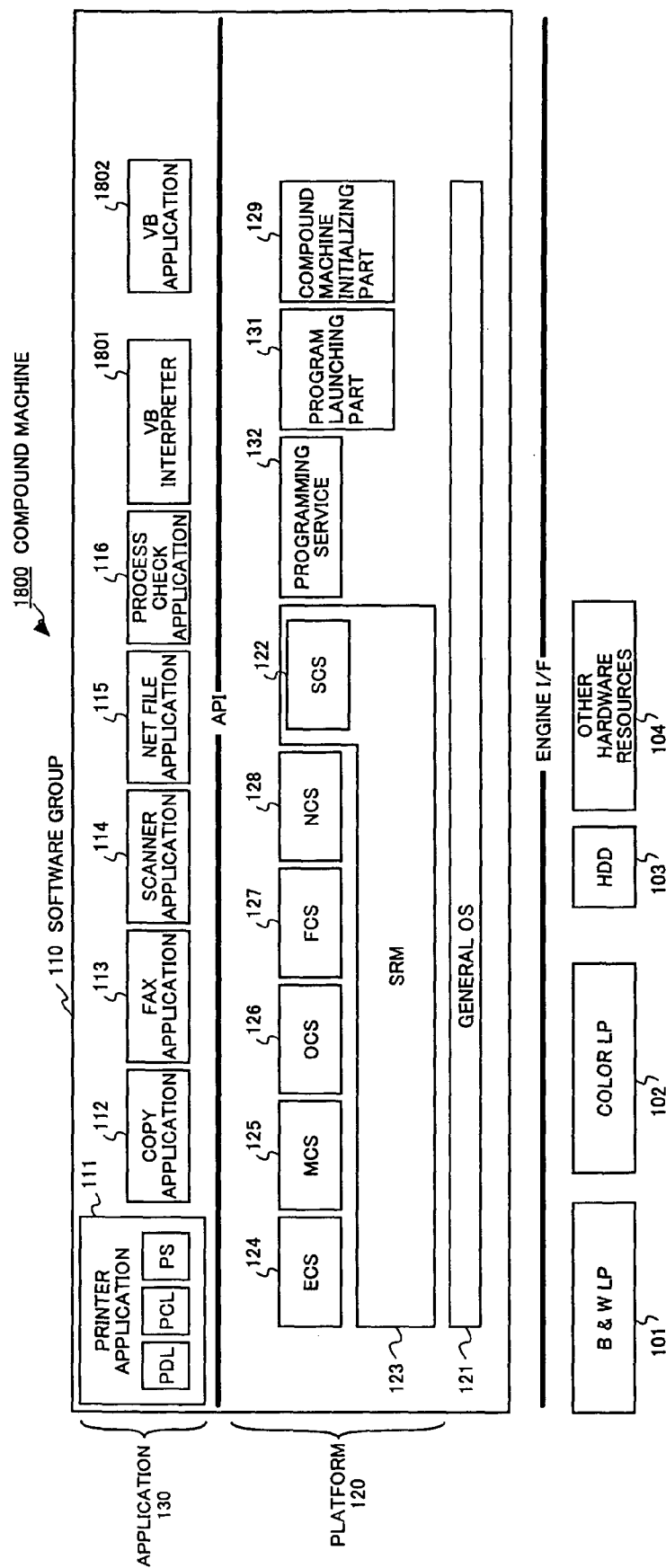
FIG. 22 shows a block diagram of the functional configuration of the compound machine according to the fifth embodiment.

FIG. 22 shows a block diagram of the functional configuration of the compound machine according to the fifth embodiment. The compound machine of the fifth embodiment is connected to the Internet using TCP/IP in the same way as the fourth embodiment. According to the compound machine, a user can input the customize program and debug the customize program from the PC 200 that is a client terminal connected to the network. In the fifth embodiment, the produced customize program is executed by the Visual Basis interpreter (referred to as VB interpreter hereinafter) included in the application layer. In the configuration, the programming service 132 may be included in the application layer.

In this embodiment, the VB application is developed on the PC 200 in which a Visual Basis development environment is installed. The developed VB application is transferred to the compound machine, and the compound machine stores the VB application. Selected on the operation panel, the VB application is launched, so that the VB application is executed by the interpreter 1801. Next, this embodiment will be described in more detail.

Figure 23:
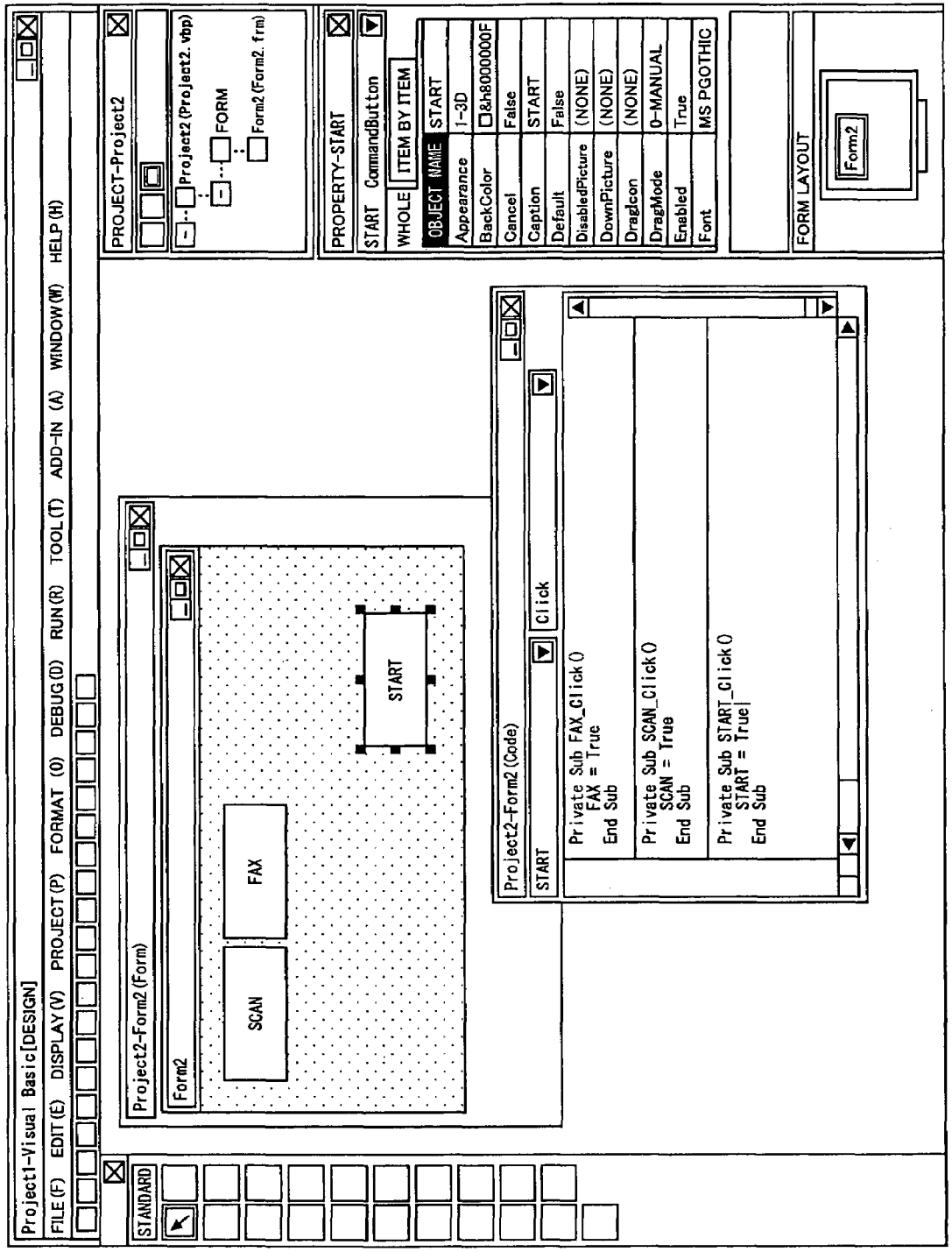
FIG. 23 shows an example in which a VB application is developed by using the Visual Basis development environment on the PC 200.

FIG. 23 shows an example in which a VB application is developed by using the Visual Basis development environment on the PC 200.

In the screen, two windows are shown. The title of one window is Project2-Form2 (Form), and the title of another window is Project2-Form2 (Code). The window of Project2-Form2 (Form) is used for producing a menu screen displayed on the operation panel of the compound machine. As shown in FIG. 23, three buttons are set. The buttons are "SCAN", "FAX" and "START". The application program is designed such that scanning, fax sending or the like is performed when a corresponding button is pushed on the operation panel.

The window of Project2-Form2 (Code) is for producing a program for performing scanning, fax sending or the like when a button in the screen is pushed.

When the program is stored in the state shown in FIG. 23, two files of Project2.vbp and Form2.frm are produced. The Project2.vbp stores information for managing a project and conditions for executing the program as variable values.

The Form2.frm is the program to be interpreted by the VB interpreter 1801. The VB application is uploaded from the PC 200 by using the programming service 132 in the compound machine from the PC 200.

When a test execution button is pushed in the programming screen 201, the VB interpreter 1801 in the compound machine is launched, and the VB application is executed. At this time, a screen same as that displayed on the operation panel 210 is displayed on the browser operating in the PC 200.

FIGS. 24, 25 shows an example of the VB application to be executed by the VB interpreter 1801. When the VB program shown in FIG. 24 is executed on the compound machine, a window including a NEXTWIN button is displayed first. If the NEXTWIN button is pushed, a function "change_display ("Form2")" is executed by call ("change_display", "Form2"), so that the screen is changed to a next screen (Form2 window).

FIG. 25 shows a VB program for displaying the Form2 window. The VB program of Form2 corresponds to the screen in FIG. 23.

In the Form2 window, when the SCAN button is pushed, following program is executed.

call ("ScanStart", A4, ADF, TIFF, BINARY, "/work/tmpfile.tif")

gwOpItemCreate(win, MESSAGE_ITEM,

| | |
|---|---|
| ITEM_MESSAGE_X, | 0, |
| ITEM_MESSAGE_Y, | 12, |
| ITEM_MESSAGE_WIDTH, | 100, |
| ITEM_MESSAGE_HEIGHT, | 12, |
| ITEM_MESSAGE_CENTER_X, | 0, |

-continued

| | |
|---|---|
| ITEM_MESSAGE_BLINK, | 0, |
| ITEM_MESSAGE, "character string", | 0, |

ITEM_MESSAGE_FONT, FONT_12, 0,0);

The first ScanStart function means reading an A4 size document from an ADF to a binary image, and storing the binary image in a file "/work/tempfile" on the HDD by using TIFF format. The VB interpreter 1801 interprets the function and causes the compound machine to operate in the above-mentioned way.

"gwOpItemCreate( )" in the next line is a function provided by the OCS 126 of the compound machine. By this function, a character string is displayed on a current screen. The function gwOpItemCreate( ) is executed by a function call to the OCS 126 by the VB interpreter 1801.

To execute the VB application produced in the above-mentioned way, the VB interpreter and the VB application are set in the launch setting file shown in FIG. 11, so that the VB interpreter and the VB application are launched in the same way as shown in FIG. 10.

Following processes are performed for displaying a screen on the operation panel when the VB application is executed on the compound machine. First, the VB interpreter 1801 waits for screen drawing a preparation end event from the SCS 122. When the VB interpreter 1801 receives the event, the VB interpreter 1801 generates a window image to be displayed initially (root window generation). Next, the VB application prepares initial screen by executing functions for generating a child window in the root window and for displaying character strings. Then, by executing a function for indicating end of screen preparation, the VB application notifies the SCS 122 of the end of the screen preparation. Next, when an application selection button is selected on the operation panel, the SCS 122 issues an event for requesting change of the owner of the operation screen. When the VB application receives the event, the VB application executes a function for indicating that the VB application can be the owner of the operation screen. At this time, the initial screen is displayed. After that, the VB application is substantively executed by the VB interpreter 1801.

As mentioned above, according to this embodiment, the application can be developed efficiently by using the VB interpreter.

Sixth Embodiment

The compound machine of the fifth embodiment is configured such that the VB interpreter is loaded on the application layer. The compound machine of the sixth embodiment is configured such that a Java execution environment is included as an application.

FIG. 26 shows a block diagram of the compound machine 1900 of the sixth embodiment. As shown in the figure, the compound machine 1900 includes a Java execution environment 1901 and a Java application 1902 in the application layer. The Java application is developed by using a PC (personal computer) and the Java application is downloaded in the compound machine. Then, the Java application is executed by using the Jva execution environment 1901.

Figure 27:
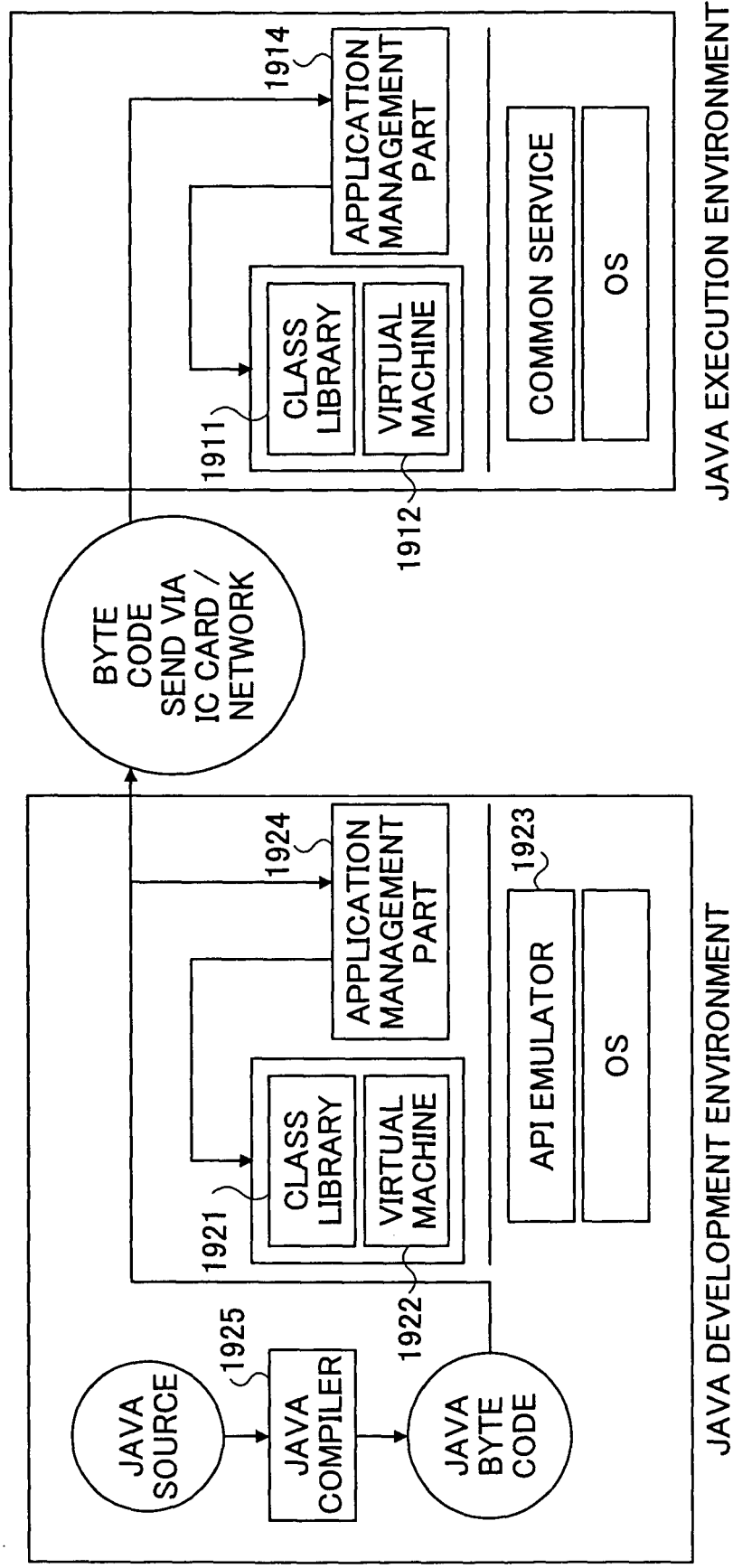
FIG. 27 shows the configurations of the Java development environment in the PC and the Java execution environment in the compound machine 1900.

FIG. 27 shows the configurations of the Java development environment in the PC and the Java execution environment in the compound machine 1900.

As shown in the figure, the Java execution environment includes a class library 1911, a virtual machine 1912, and an application management part 1914.

The class library 1911 is a class library used for providing services for the Java application to operate the compound machine easily. The class library of this embodiment includes, for example, operation panel classes, event classes, compound machine control classes, network transaction classes, basic Java classes and the like. The Java application itself is a set of classes, and the classes refer to classes in the class library so that the Java application performs its processing. If the Java application includes all capabilities of classes of the class library used by the application, the Java execution environment may be configured without the class library.

Source code of a Java program is compiled to byte code as intermediate code. The virtual machine 1912 interprets and executes the byte code.

The application management part 1914 has capabilities for managing Java applications. For example, the capabilities include listing of Java applications, execution management of Java application such as launch and forced termination, load and upgrade of Java application, deletion of installed Java application, password setting for application registration and the like.

Figure 28:
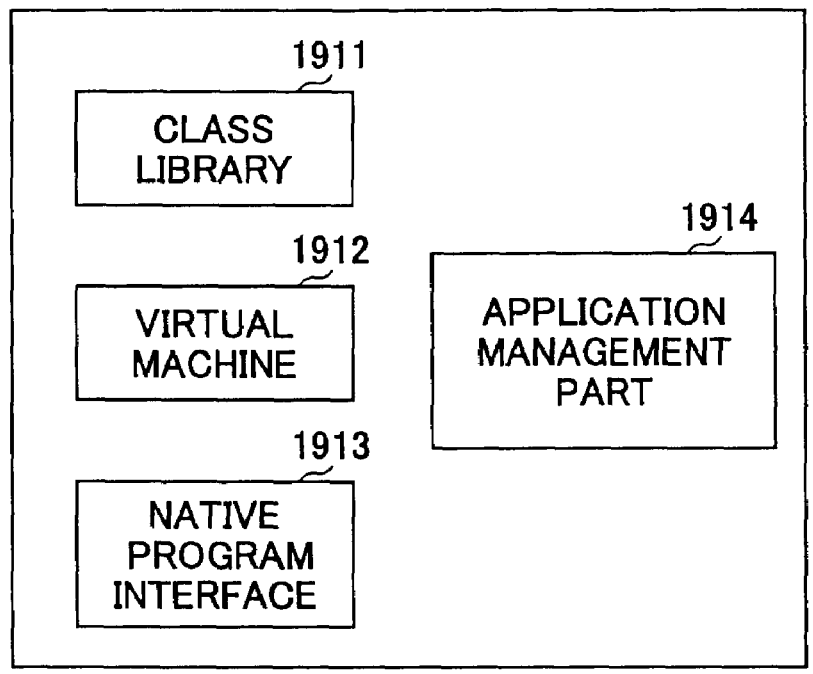
FIG. 28 shows the Java execution environment in the compound machine 1900.

More specifically, as shown in FIG. 28, the execution environment further includes a native program interface 1913. The native program interface 1913 has capabilities for the Java code executed by the virtual machine 1912 to operate with applications or libraries written by other programming language such as C. By using the mechanism of the native program interface 1913, the Java application can access APIs of control services.

Similar to the Java execution environment, the Java development environment includes a class library 1921, a virtual machine 1922 and an application management part 1924. Further, the Java execution environment includes a Java compiler 1925 for generating the byte code and an emulator 1923 for emulating operations of the compound machine running the Java application. The Java application developed by the Java development environment can be loaded into the Java execution environment of the compound machine via a recording medium such as IC card and the like. In addition, the Java application can be loaded via a network.

Figure 29:
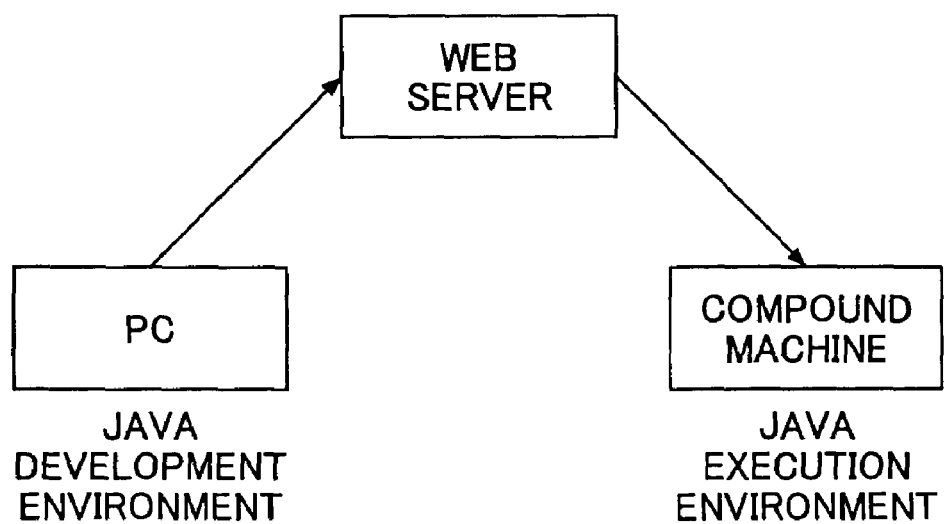
FIG. 29 shows a network configuration including a Web server.

For example, as shown in FIG. 29, by storing Java applications developed by the Java development environment in a Web server, the Java execution environment can access the Web server to load a Java application. Instead of the Web server, a FTP server can be used.

(Development of Java Application)

Next, development of Java application in the Java development environment will be described in detail.

Figure 30:
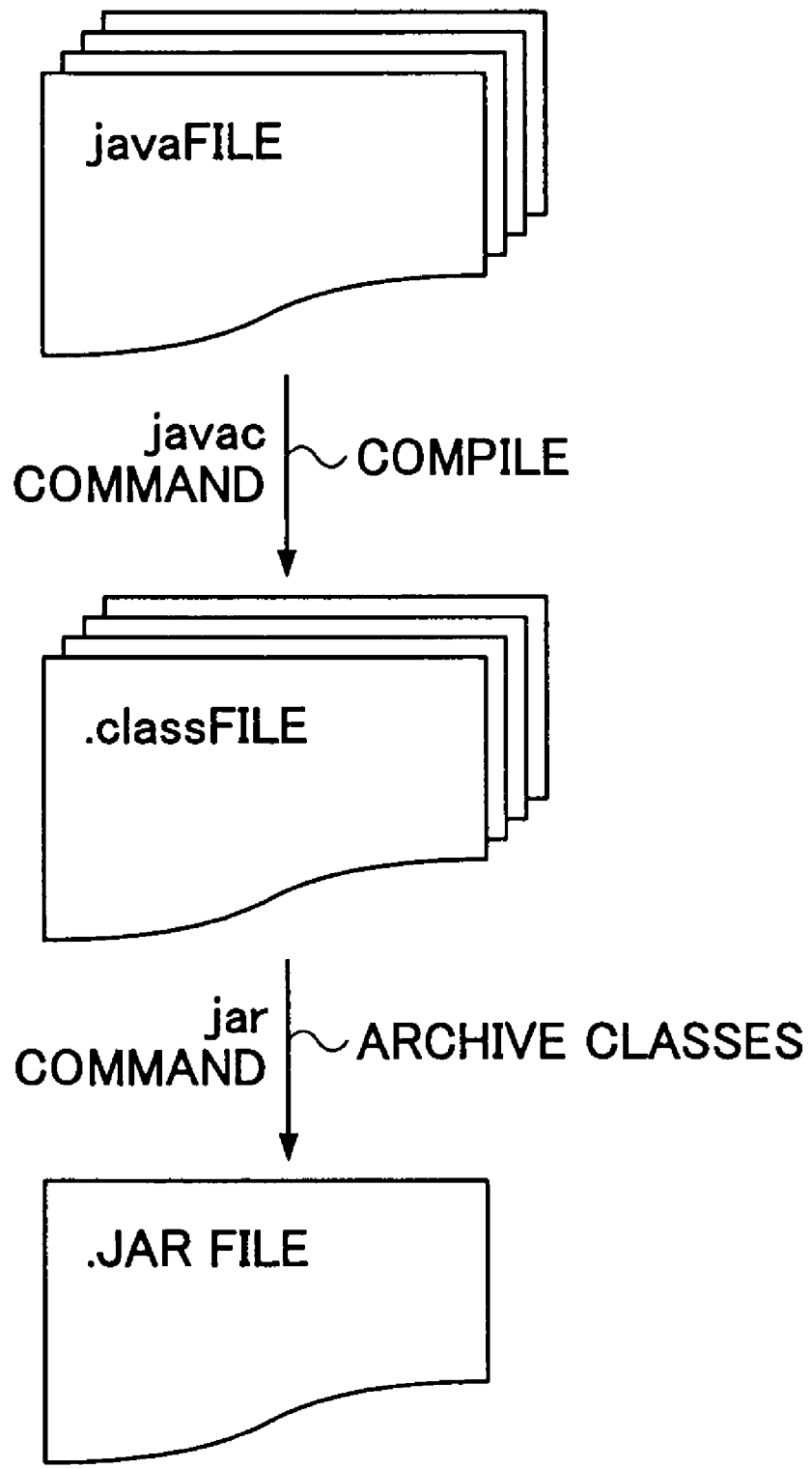
FIG. 30 shows a flow of Java application development.

FIG. 30 shows a flow of Java application development. As shown in FIG. 30, first, source code of Java is produced as a Java file. Then, the source code is compiled by the Java compiler to generate a class file. Then, a plurality of class files are archived to a Jar file. It is desirable to include a file indicating a class having "main" routine.

Debugging of the Java application is available by executing the Java application on the compound machine in the same way as the previously described embodiments. According to this embodiment, debugging is available without the target compound machine by using the emulator 1923 shown in FIG. 27. It is relatively easy to emulate the execution environment when Java is used since Java uses the virtual machine. After development of the application by using the emulator is completed, the Java application (byte code) is loaded into the compound machine via a network or via an IC card. Then, evaluation of the application can be performed on the compound machine.

The emulator can be configured such that the emulator receives instructions from the Java application and operates the PC according to the instructions. For example, for an instruction for displaying data on a display part of the operation panel, the emulator causes the PC to display a screen same as the screen to be displayed on the display part of the compound machine. The PC does not have engines (scanner, printer and the like) that are included in the compound machine. Therefore, for example, for a print instruction from the Java application, the emulator causes the PC to display an image showing printing, or the emulator causes the PC to actually print out a paper to a default printer. When the user pushes a copy button in an emulated screen on the PC, for example, the emulator causes the PC to notify the user to select a file to be copied from a local file system, and causes the PC to display a dialog box to input copy destination, and causes the PC to copy the selected file to the copy destination.

Figure 31:
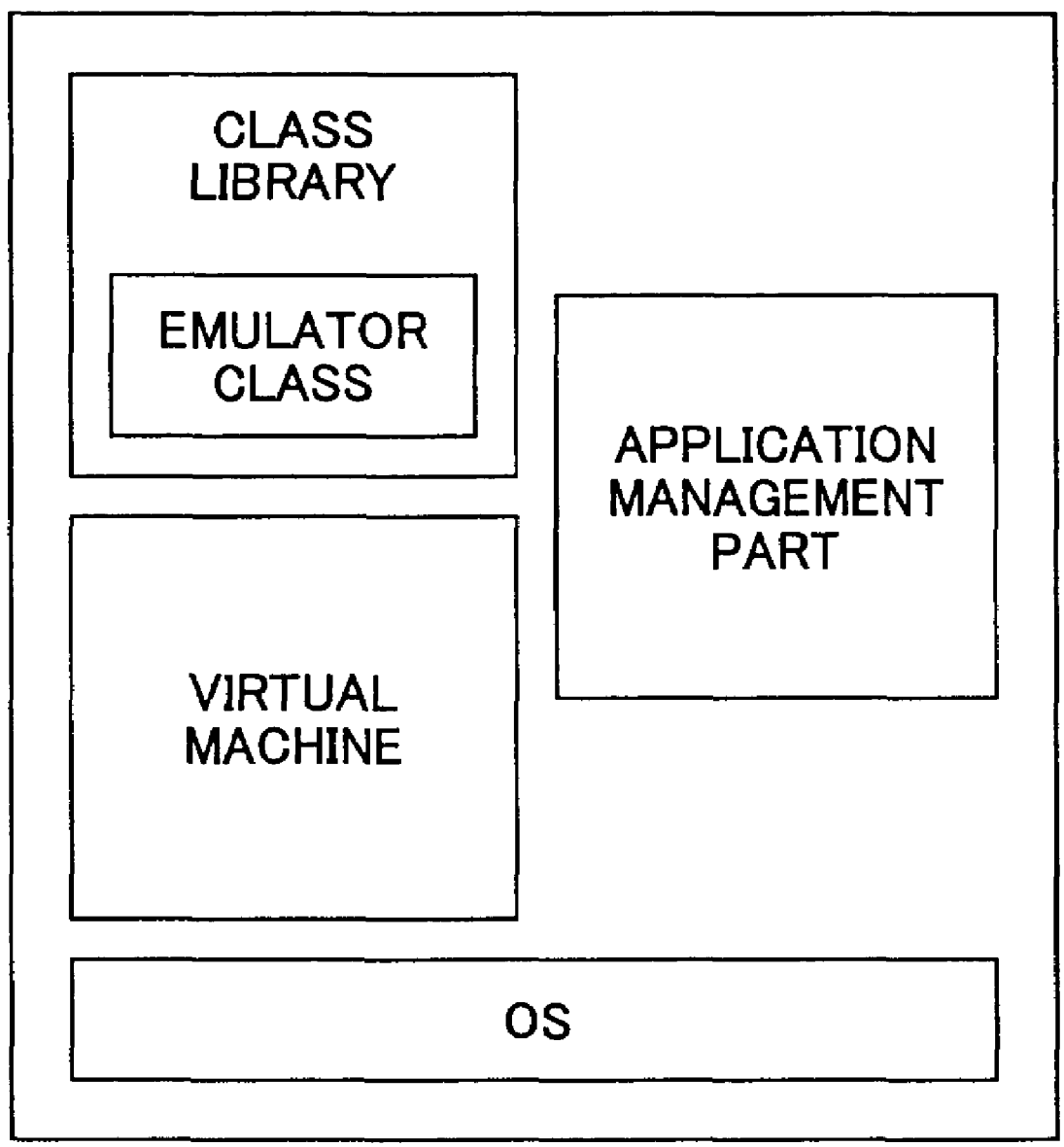
FIG. 31 shows another example of Java development environment.

The emulator can be implemented as a separate program from the virtual machine and the class library as shown in FIG. 27. In addition, the emulator can be also implemented as a class in the class library as shown in FIG. 31.

Figure 32:
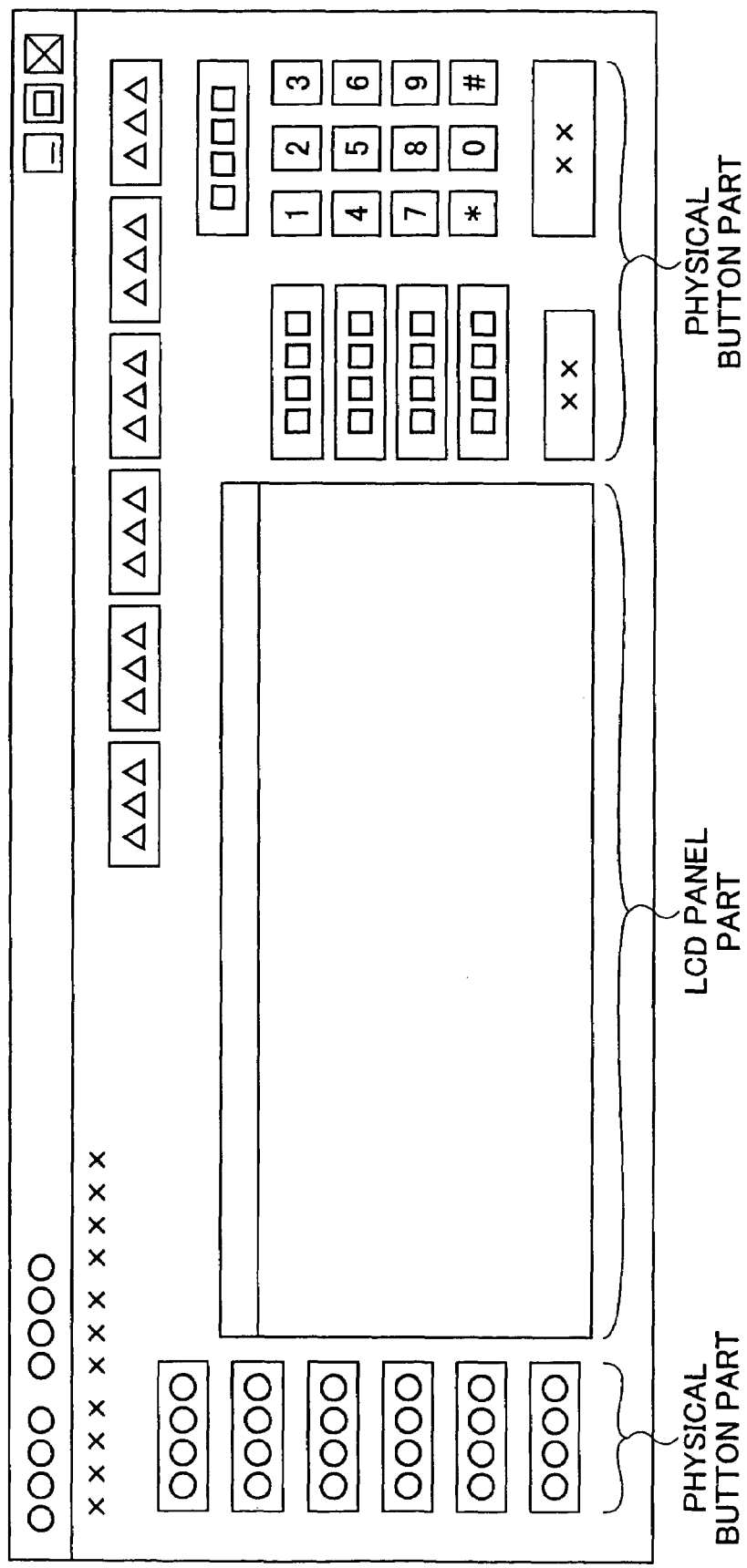
FIG. 32 shows an operation panel screen displayed on the PC by the emulator.
Figure 33:
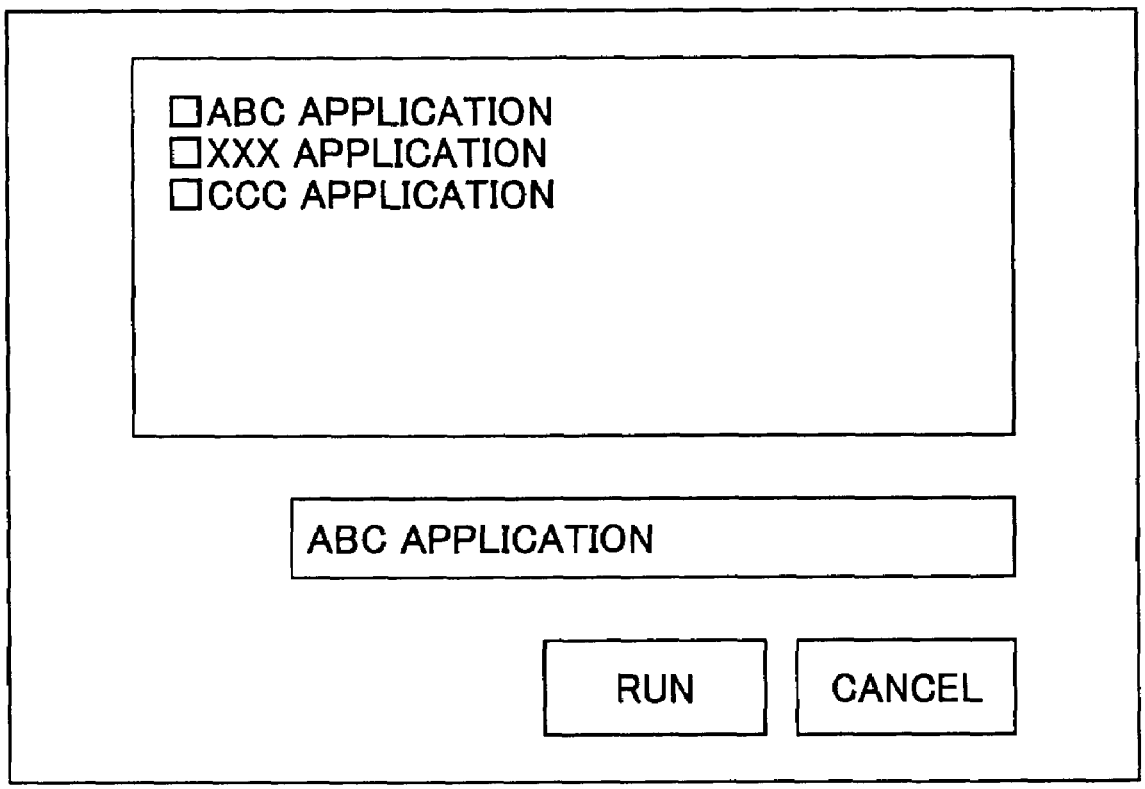
FIG. 33 shows a screen when the emulator executes loader capability.

FIG. 32 shows an operation panel screen displayed on the PC by the emulator. The elements such as buttons displayed on the screen are equivalent to those of the actual compound machine. In addition, the emulator has capabilities of a loader for selecting a Java application stored in the PC and executing the selected Java application. If the emulator executes the loader capability, for example, a screen shown in FIG. 33 is displayed. Then, the user selects a Java application, and the Java application is executed by pushing the execution button. The Java application displayed on the screen is a class name having main routine or a name of a Jar file.

The emulator also has a capability for logging state information of an application operating on the emulator. In addition, messages to be logged can be set. For example, the user can set the emulator such that only serious errors that may abnormally terminate the application are logged, or, detailed information that can be used for debugging are logged.

Debugging by using the emulator can be applied to other embodiments of the present invention. That is, for example, in the first embodiment, PC 200 may include the interpreter and an emulator similar to that of the present embodiment. After debugging of a program ends, the program is sent to the compound machine to evaluate the program by accessing the compound machine.

(Example of Java Application)

Figure 34:
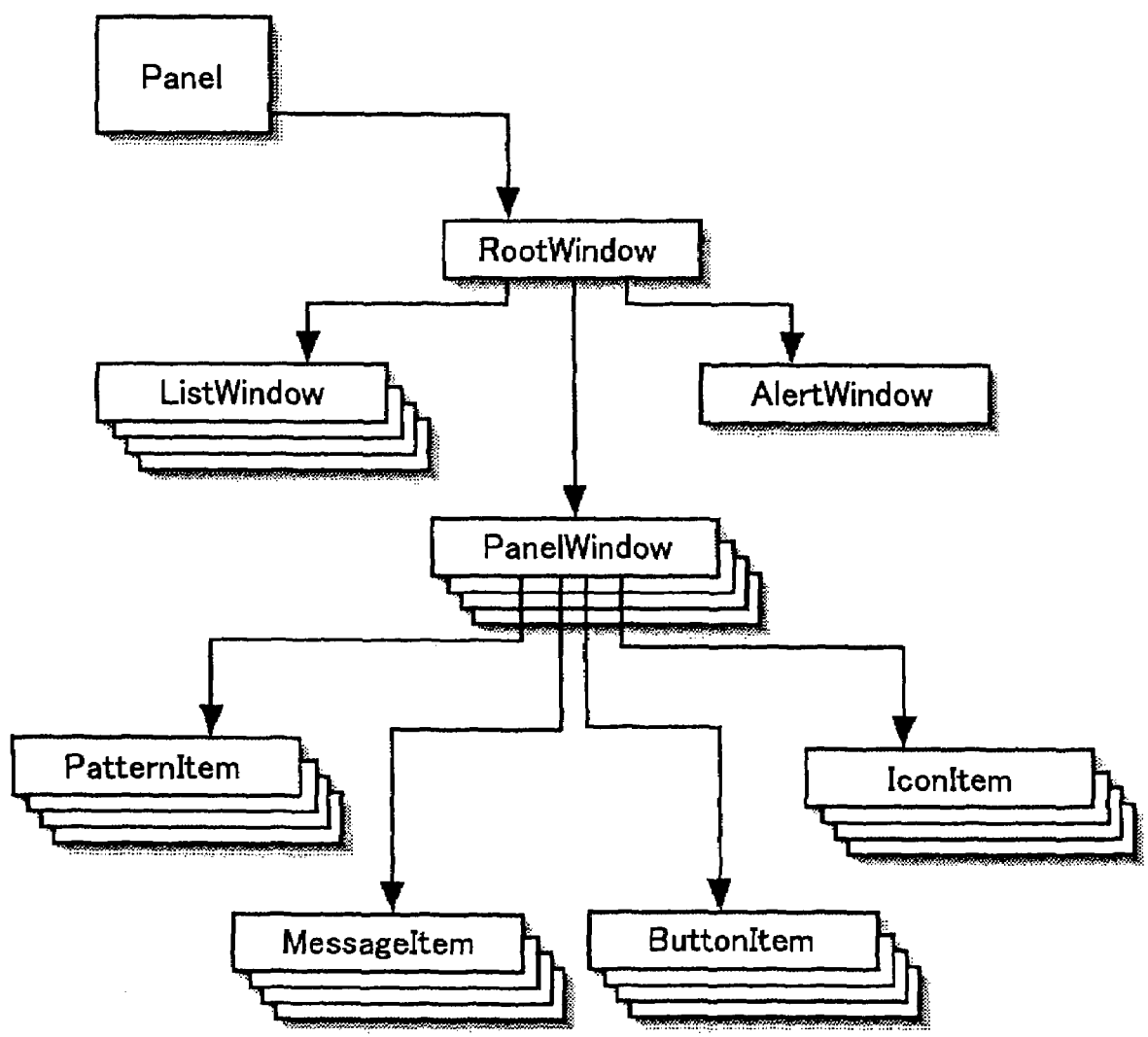
FIG. 34 shows a hierarchical structure of the operation panel classes.
Figure 35:
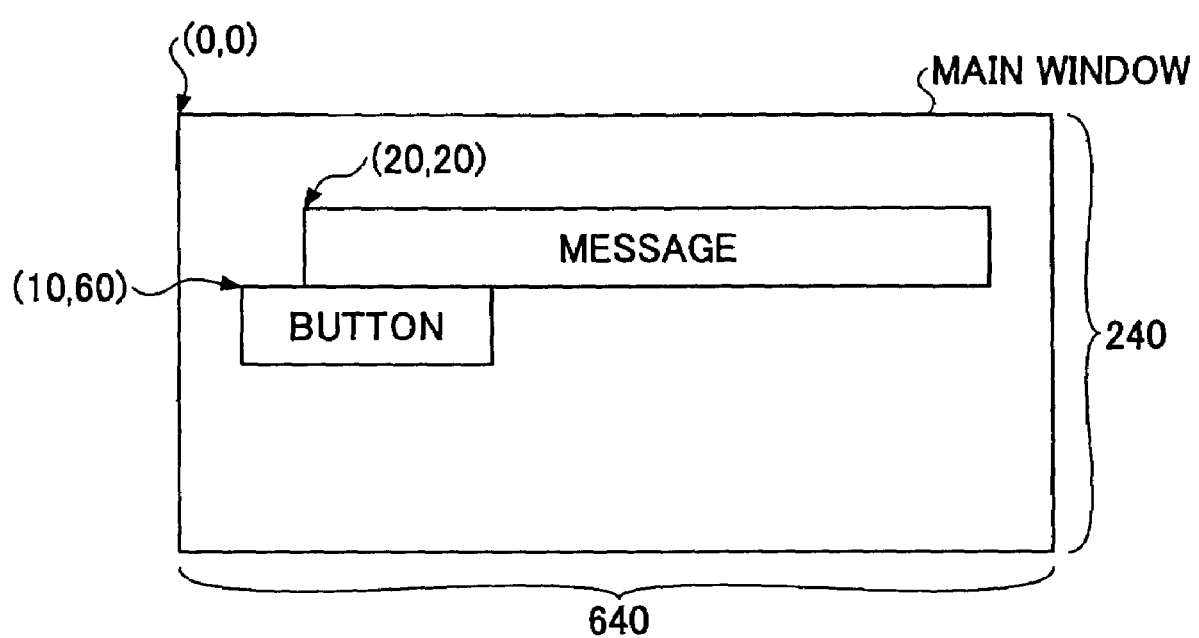
FIG. 35 is a figure for explaining classes for producing a window.

Next, an example of Java application will be described. The following example is a sample program of Java using operation panel classes. FIG. 34 shows a hierarchical structure of the operation panel classes. In FIG. 34, the classes of \*\*\*Window are classes for producing a window, and the classes of \*\*\*\*Item are classes for producing elements such as buttons in the window. For example, a program including following code can make a main window and elements in the window shown in FIG. 35.

mainwindow=newPanelWindow(panel.root( ),640,240); (a)

MessageItem msg=new MessageItem(20, 20, 600, 40); (b)

ButtonItem Button=new ButtonItem(10, 60, 80, 30); (c)

(a) is code for making the main window of 640 dot width and 240 dot height. (b) is code for producing a message item of 600 dot width and 40 dot height at a position (20, 20). (c) is code for making a button of 80 dot width and 30 dot height at (10, 60).

Figure 37:
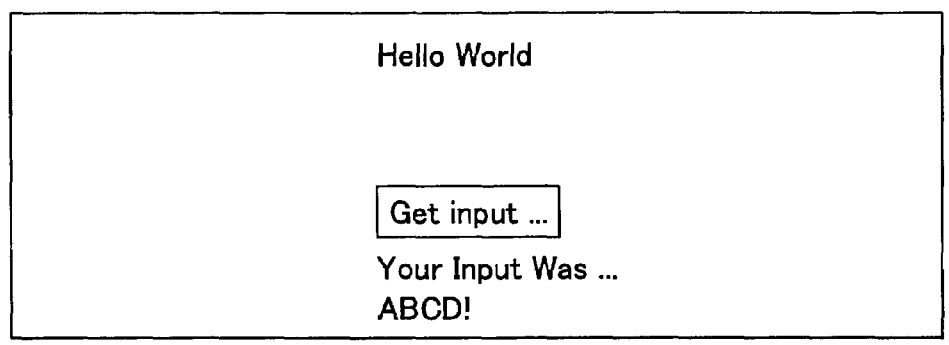
FIG. 37 shows execution result of the Java program shown in FIG. 36.

The program shown in FIG. 36 is for implementing a user interface on the operation panel of the compound machine. As shown in FIG. 37, the program displays messages of "Hello World" and "Your Input Was . . . " and a button of "Get Input . . . ". When the user touches the button "Get Input . . . ", a soft keyboard is displayed on the panel. The soft keyboard displays a title of "Add your Input" to invite the user to input code. When the user input a string, "ABCD!", for example, from the soft keyboard, the string, "ABCD!" is displayed under the message of "Your Input Was . . . ".

In the following, the sample program shown in FIG. 36 will be described along the number of remarks.

(1) is an instruction for using the operation panel class library. (2) indicates inheriting GWApp, so that application class of the compound machine can be used. In addition, by inheriting GWApp, the user do not need to write code for complicated initialization and end processing, in addition, processing such as message receiving can be hidden to the user. By the code of (3), an object for displaying the message of "Hello World" is generated. By the code of (4), a button object of "Get Input . . . " is generated. Then, by the code of (5), an object for displaying a message of "Your Input Was . . . " is generated. By the code of (6), an message object for displaying characters input from the soft keyboard is generated.

(Execution of Java Application in Java Execution Environment)

In the configuration shown in FIG. 27, by using capabilities of the application management part 1914, processing from download to application execution can be performed in the following way.

The application management part 1914 is launched at the time of launch of the compound machine like the other applications. By pushing an application launch key, for example, the application management part 1914 displays a user interface on the operation panel. At this time, if a Java application is not loaded, the application management part 1914 displays an application load screen. From the application load screen, the user causes the compound machine to access a predetermined Web site or an IC card to load the Java application into the compound machine.

In the processing of loading, before loading the Java application, the application management part 1914 inquires of the Web server information on the Java application to check whether the Java application can be installed. For example, the application management part 1914 checks program size, version, program latest update information, memory work size to be used, storage size to be used, network address to be used, available term of the application (number of times the application can be used), application program name and the like.

After checking the above items, if the application management part determines that the application is installable, the application management part 1914 downloads the Java application file into the compound machine.

After the download of the Java application program ends, the application management part obtains application name and add the name to an application list. At the same time, the Java application is stored in the hard disk of the compound machine.

By completing the above processing, the Java application can be used. When the user selects a Java application from a Java application launch screen provided by the application management part 1914, the virtual machine is launched and the Java application is executed.

The Java application cab be also executed in the following way. The following method is an example in which the Java application is loaded from the Web server in the configuration shown in FIG. 29. Following processing is executed by a loader (program) including in the application management part 1914. The loader itself can be implemented as a Java application, or can be implemented by using other language such as C language.

Figure 38:
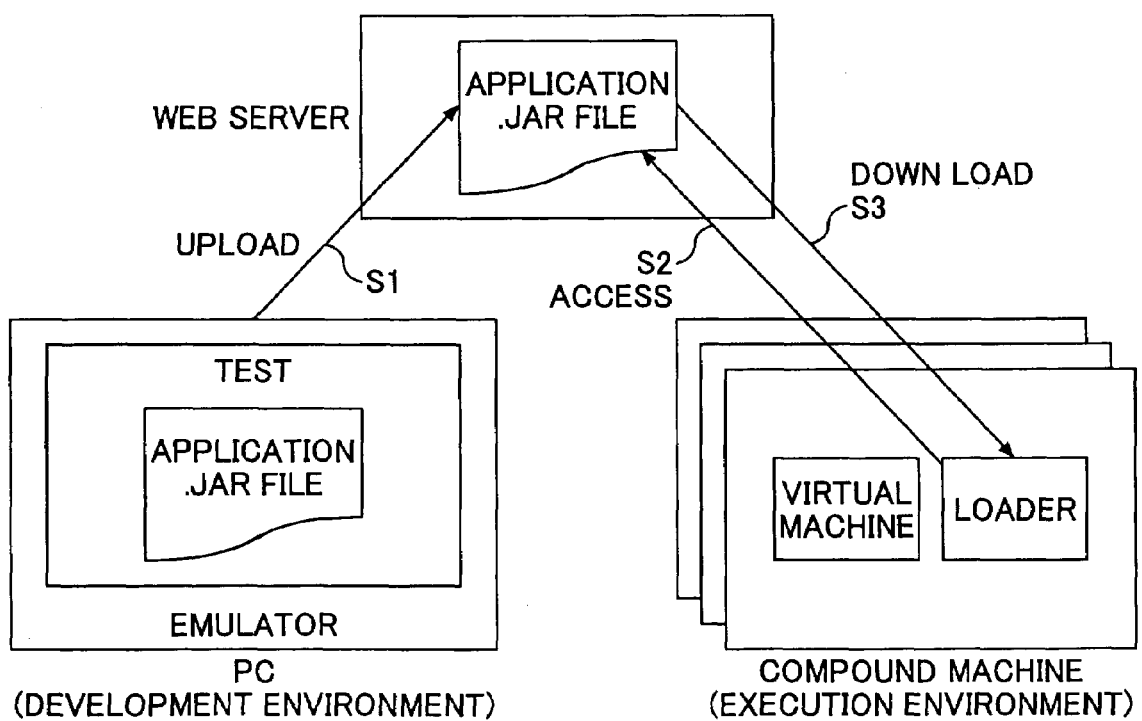
FIG. 38 shows a conceptual illustration from upload to download of the Java application.

FIG. 38 shows a conceptual illustration from upload to download of the Java application. As shown in FIG. 38, the Java application that has been developed and tested in the Java development environment is uploaded to a Web server in step 1. The loader of the compound machine accesses the Web server in step 2, downloads the Java application the user wants in step 3, and the Java application is executed.

Figure 39:
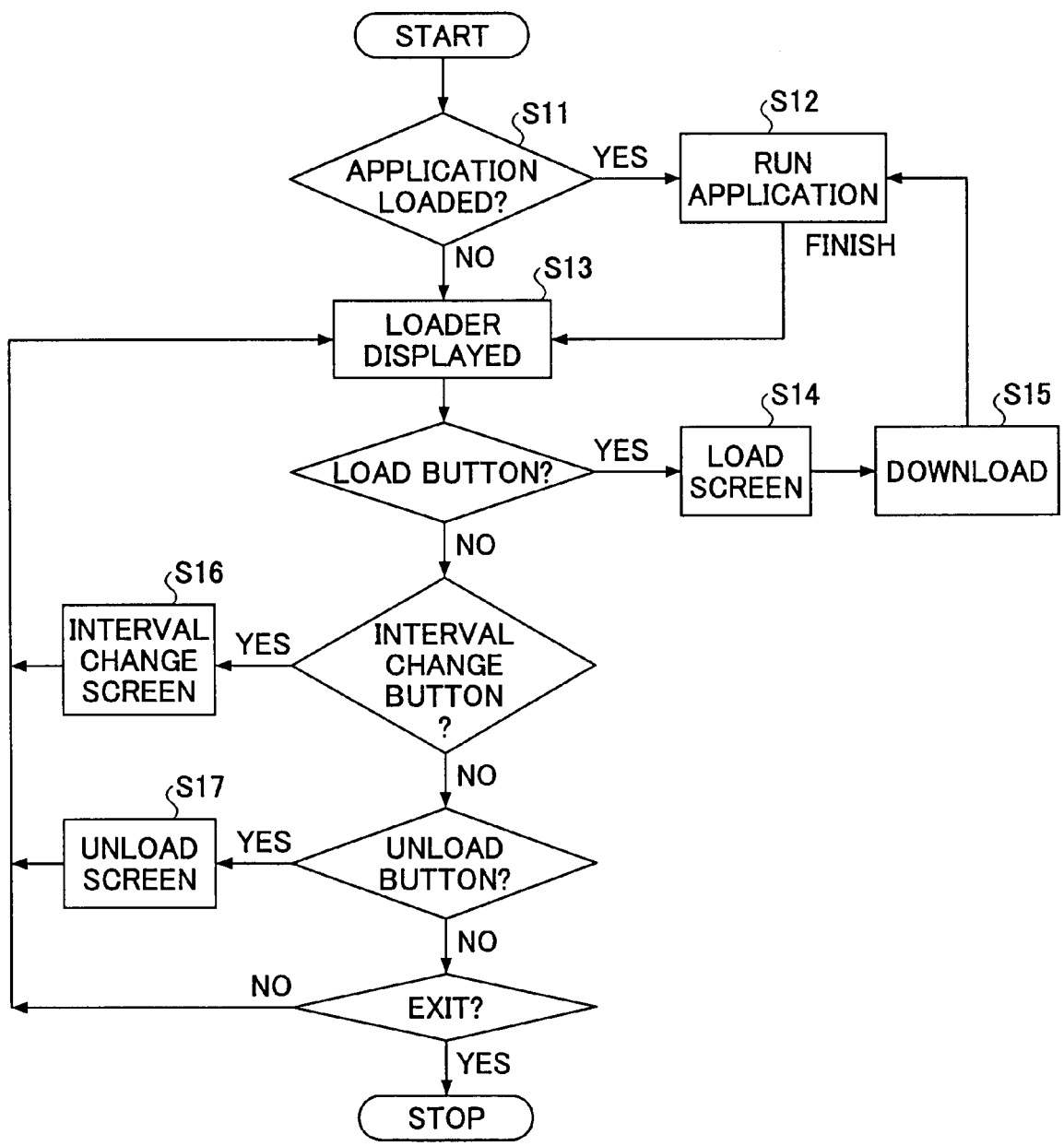
FIG. 39 is a flowchart showing processing procedure of the loader.

Next, processing procedure of the loader will be described with reference to a flowchart of FIG. 39.

The user pushes a predetermined button for changing application. Then, the loader checks if a Java application is already loaded in step S11. If the Java application is already loaded, the Java application is executed in step S12. Then, a user interface of the Java application is displayed. If the Java application is not loaded, a screen of the loader is displayed in step S13. Also when execution of the Java application ends, the screen of the loader is displayed. In addition, while the user interface of the Java application is displayed, if the user inputs predetermined code and pushes a predetermined button, the screen of the loader can be displayed.

Figure 40:
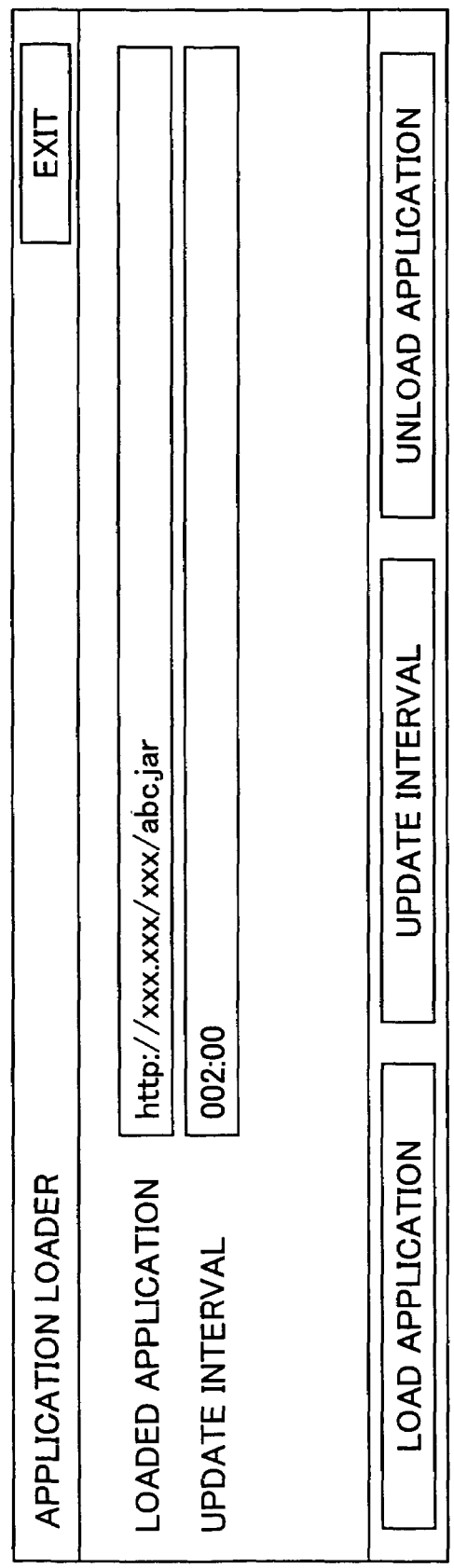
FIG. 40 shows a screen of the loader displayed on the compound machine.

FIG. 40 shows a screen of the loader displayed on the compound machine. The loader displays a Java application name if the Java application is currently loaded in the compound machine, and displays frequency for checking update of the Java application in the Web server.

Figure 41:
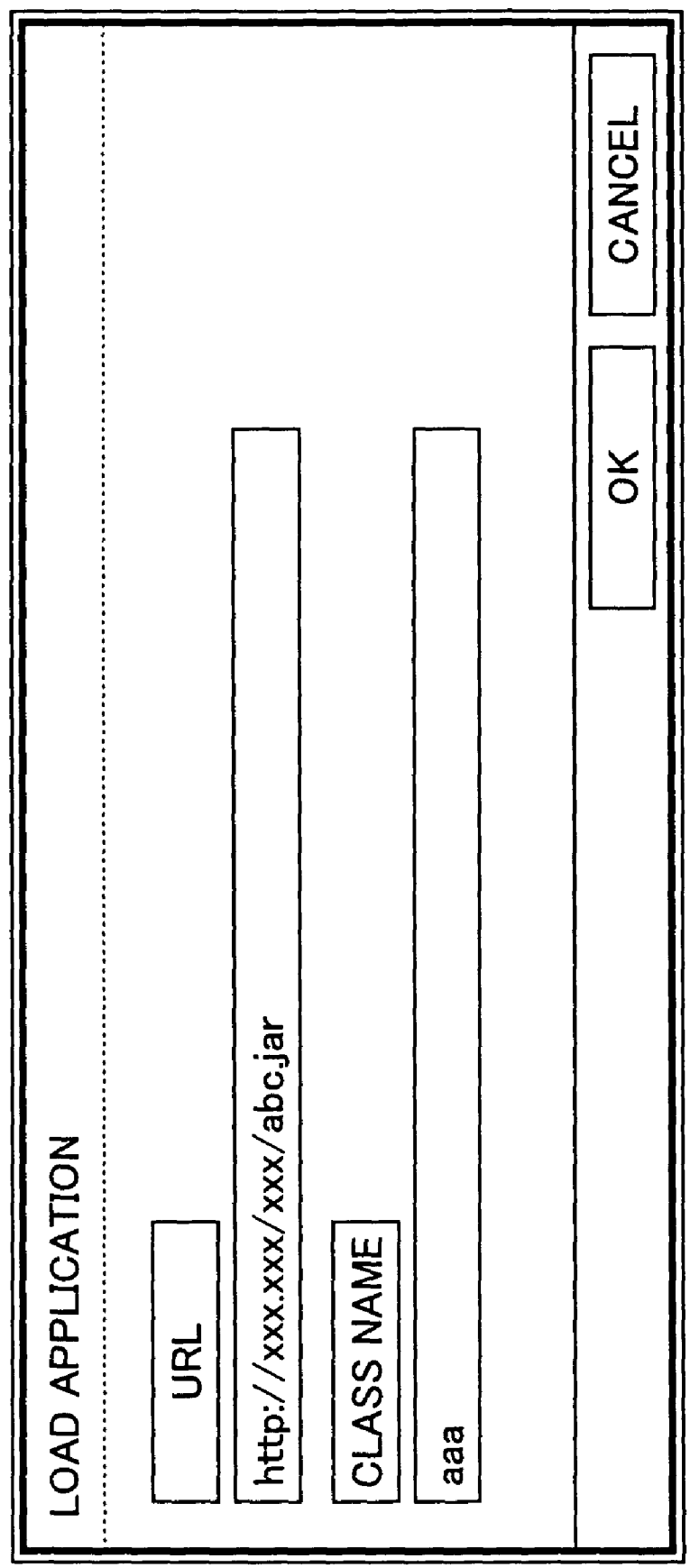
FIG. 41 shows a load application window.

On the screen of the loader, when the user touches the button of "load application", an application load window shown in FIG. 41 is displayed in step S14. URL of the Java application is input in the window. For inputting the URL, the user touches the URL button to display a soft keyboard. Then, the user types the URL by using the soft keyboard. In addition, by touching the URL button, the loader may displays a list of Java applications shown in FIG. 42. Then, the user can selects a Java application from among the list. The user inputs a name of a class having main routine in the field of the class name shown in FIG. 41 as necessary.

After that, by touching OK button shown in FIG. 41, the Java application is downloaded from the Web server in step S15, so that the Java application is executed by the compound machine.

The loader automatically accesses the Web server at predetermined intervals to check whether the updated Java application is stored in the Web server. For checking the update, the loader compares date and time stamp of the currently loaded application with those of the corresponding application in the Web server. If an updated Java application is found, the currently operating application is deleted and the updated application is downloaded.

Figure 43:
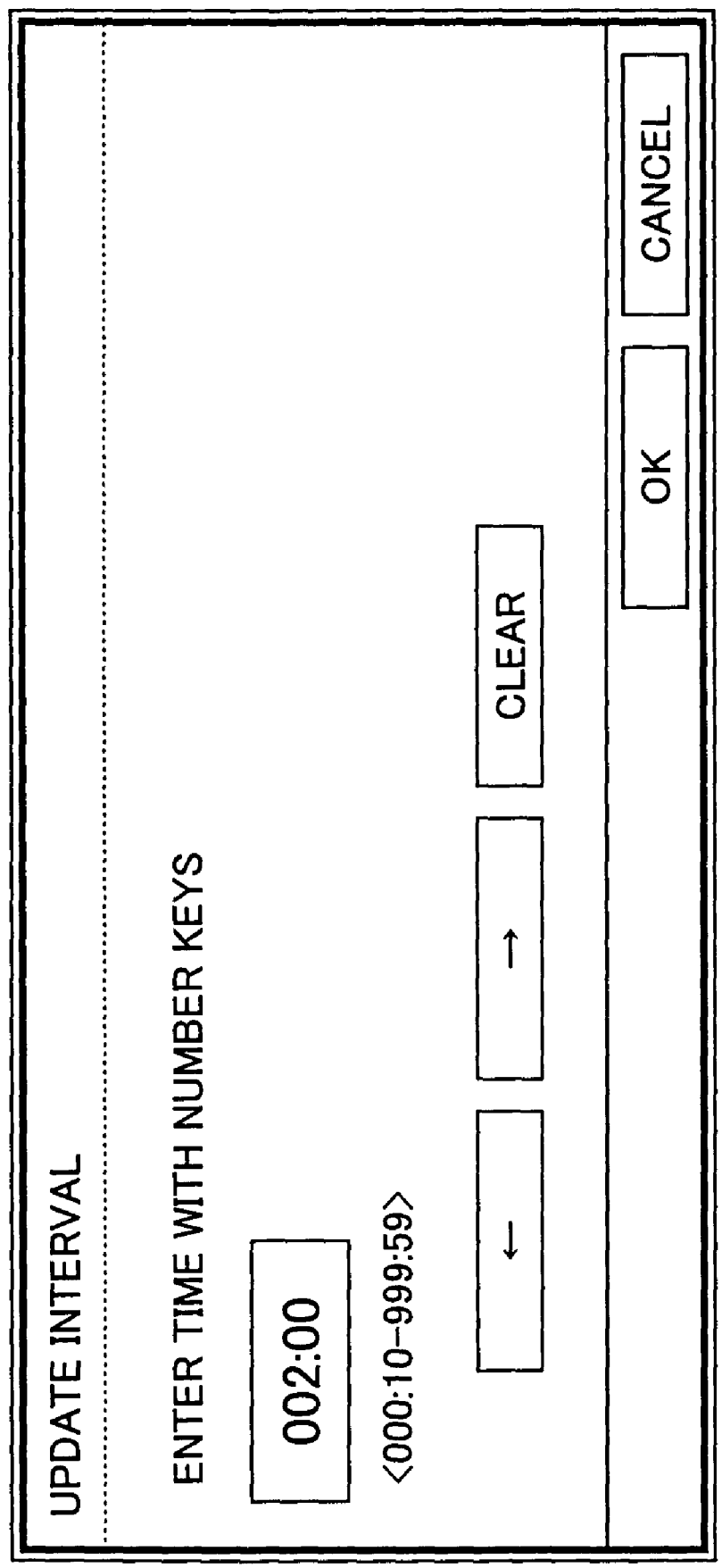
FIG. 43 shows a window for changing update interval.

To change the check interval, the user touches the update interval button shown in FIG. 40 to display a screen shown in FIG. 43 in step S16. Then, the user selects hour or minute by using arrow key in the screen, and inputs a new interval by using numeric keys of the operation panel.

Figure 44:
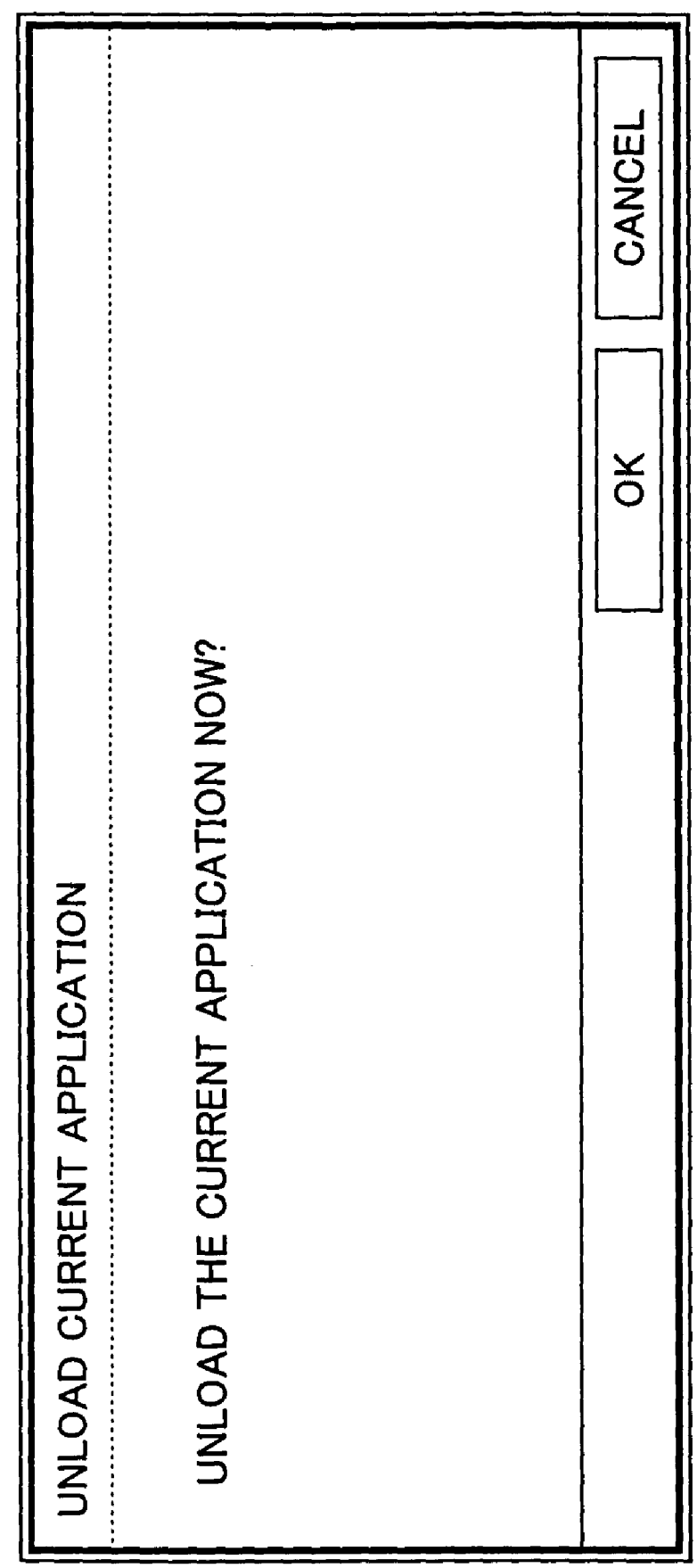
FIG. 44 shows a window for unloading current application.

For deleting a Java application from the compound machine, the user touches "unload application" button shown in FIG. 40 to display a screen shown in FIG. 44 in step S17. By touching the "OK" button, the Java application is deleted. The loader ends by touching Exit button shown in FIG. 40.

In this embodiment, a customize program can be produced by connecting Java applications. The processing for connecting the applications will be described with reference to FIG. 45. The program for producing the customize program is a Java application that is referred to as customize application hereinafter. The customize application may be installed in the compound machine beforehand.

First, by switching the screen on the operation panel to the loader screen shown in FIG. 40 so as to load and execute the customize application.

Figure 45:
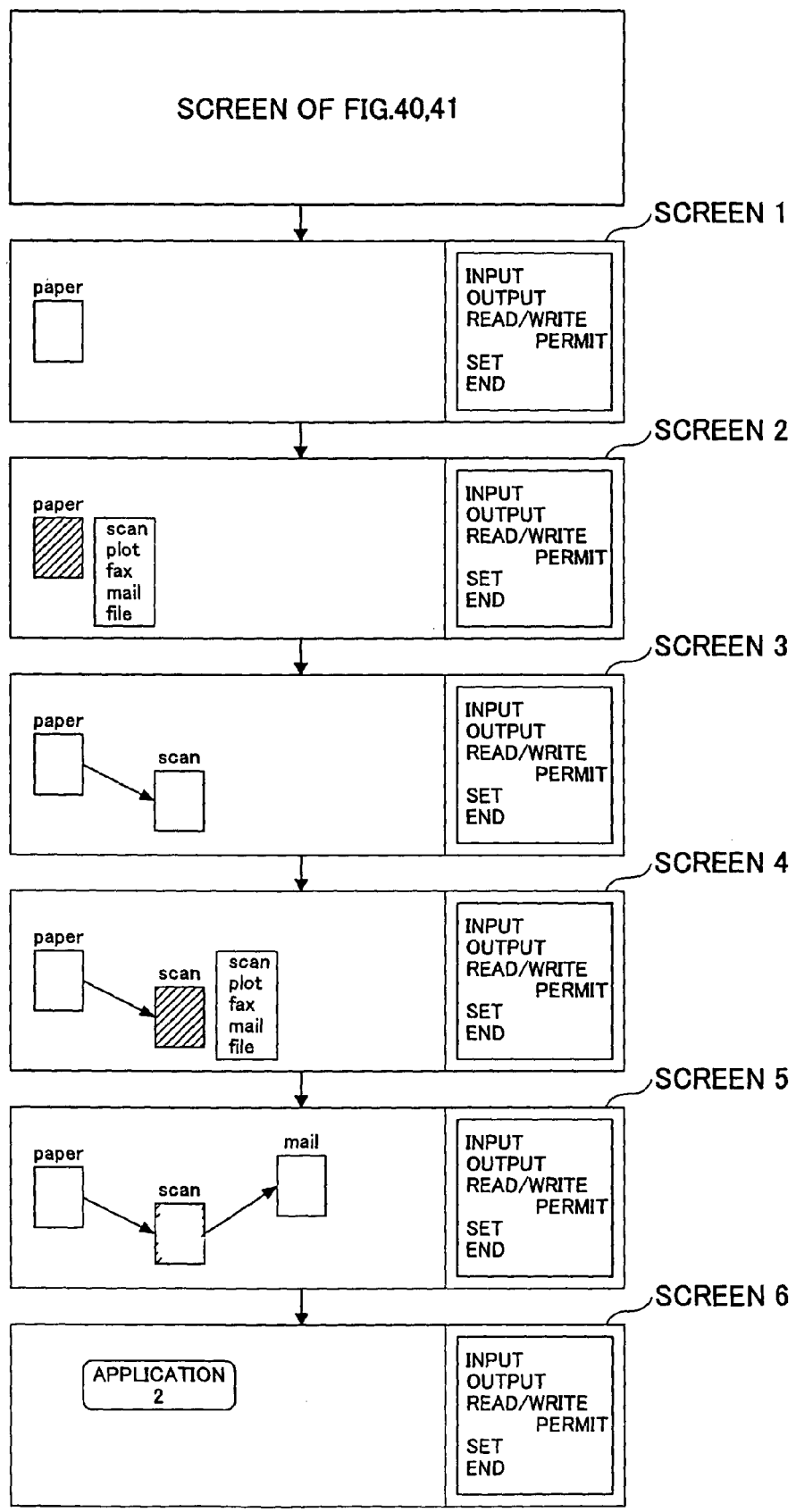
FIG. 45 shows a procedure for connecting applications.

The customize application displays a screen 1 in FIG. 45. On the screen 1, only a paper object is shown. Other object may be input. An object can be input and output by using "input" button and "output" button. In addition, on the screen 1, an attribute such as read/write permission can be set for the paper object by "read/write permission" button.

When the user touches "paper" on the screen 1, a list of objects that can be connected to the paper object is displayed as shown in screen 2. When "scan" is selected, the screen 2 transfers to the screen 3. Then, by touching "scan", a list of objects that can be connected to the scan object is displayed as shown in screen 4. If "mail" is selected on the screen 4, the screen 4 transfers to screen 5.

After that, by touching "setting" button, a customize program is produced in which the customize program performs processing for scanning a paper and sending the scanned image file by a mail. In addition, as shown in screen 6, a key is assigned to the customize program. By operating the key on the compound machine, the customize program is executed. The customize program is a program for executing connected classes one by one.

Downloading applications from the Web server, and producing a customize program by connecting applications can be applied for other embodiments of the present invention. For example, in the before mentioned configuration using the VB interpreter, by providing the compound machine with a loader similar to this embodiment, the compound machine can download applications from the server.

Each of service programs and application programs described so far can be stored in a recording medium such as IC card and the like, and can be stored in the compound machine. In addition, each of service programs and application programs described so far can be stored in the compound machine from an external server via a network.

As mentioned above, according to the present embodiment, an application can be developed efficiently by using the Java environments.

Seventh Embodiment

As mentioned in the Related Art, according to the compound machine, applications can be added to the compound machine after shipment of the compound machine. Thus, there may by a case where a plurality of applications developed by a plurality of vendors run at the same time on the compound machine. In addition, there may by a case where an application that includes a plurality of modules developed by a plurality of sections run on the compound machine.

Since each vendor develops the application by using its own method, there is a possibility of affecting preinstalled applications and the system of the compound machine. Especially, if usage of shared variables and events of the compound machine is left to each vendor, there is a possibility that software failure may occur in the compound machine so that the system of the compound machine becomes unstable. This problem may arise not only for the image forming apparatus but also for general information processing apparatuses.

In the following, an application and an information processing apparatus for solving the above-mentioned problem will be described. In the following, a compound machine will be described as an example of the information processing apparatus.

The configuration of the compound machine of this embodiment is the same as that of the first embodiment. In this embodiment, the external application 117 is produced according to a state transition model. The external application 117 is linked with a utility library including a state transition model launch function.

Figure 46:
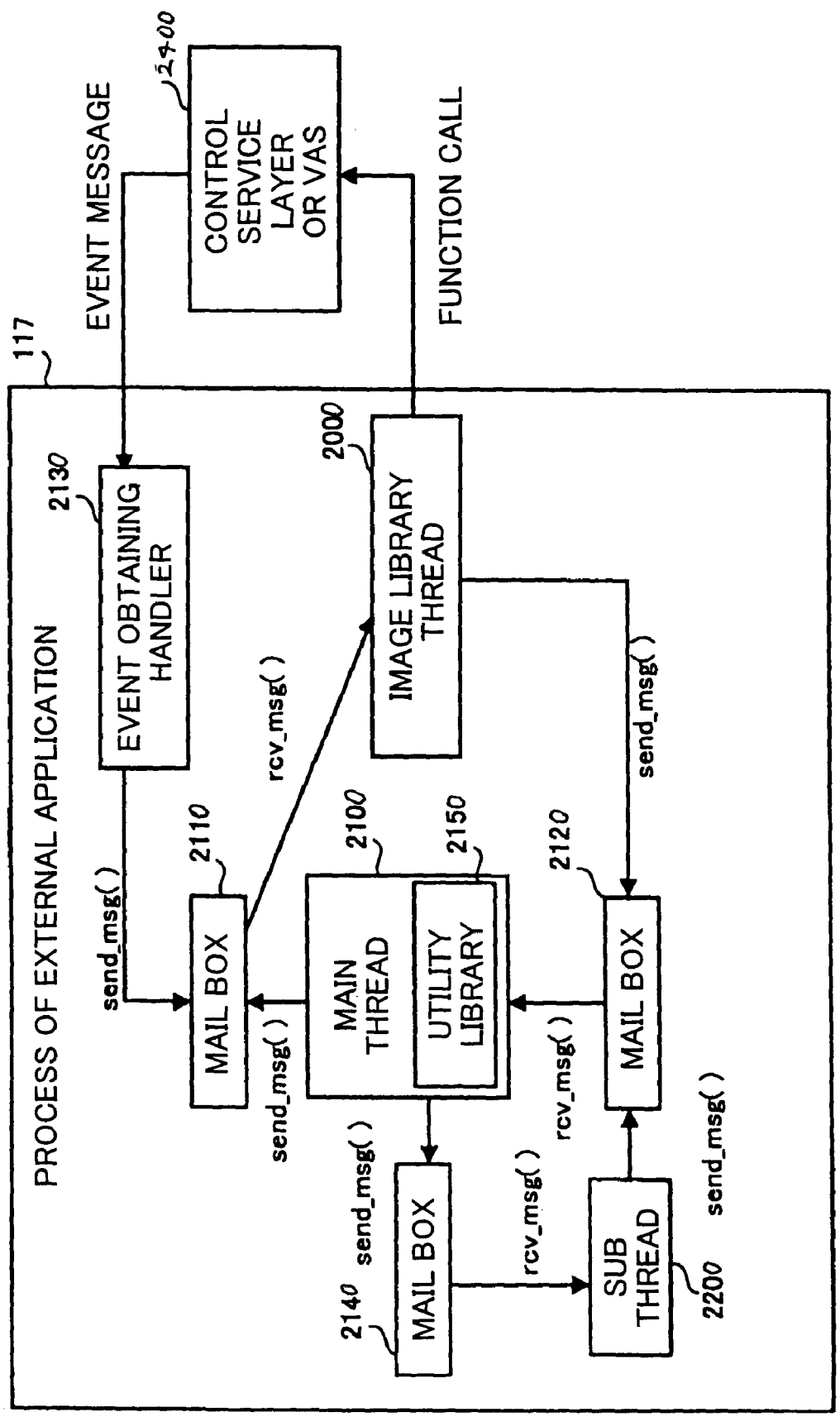
FIG. 46 shows a configuration in the the process of the external application 117 according to the seventh embodiment.

The process of the external application 177 is a multi-thread environment in which a plurality of threads are executed in parallel. As shown in FIG. 46, in the process of the external application 117, a main thread and an image library thread are executed in parallel. The main thread 2100 is a thread that executes main processing of the external application. The main thread calls the image library thread 2000, so that function calling to control services and VAS (virtual application service), receiving the return values, and message sending/receiving are realized.

In addition, the process of the external application includes a sub thread 2200, mail boxes 2110, 220 and 2140, and an event obtaining handler (thread) 2130. The main thread 2100 includes a utility library 2150 in which state transition model launch functions are registered.

The mail box 2110 is used for communication among the main thread 2100, the image library thread 2000, and the event obtaining handler 2130. The mail box 2120 is used for communication between the main thread 2100 and the image liberally thread 2000. The event obtaining handler 2130 receives an event message from a process of a control service such as ECS or MCS or the VAS, and writes the event message in the mail box 2110.

When the main thread 2100 accesses the control service, the main thread 2100 sets up the mail boxes 2110, 2120 and 2140, then, launches the image library thread 2000.

The main thread 2100 puts a command for function calling for the image library thread 2000 in the mail box 2110, in which the source information is set as MB_REQUEST. In addition, an event message from the control service and the like is also put in the mail box 2110 as a mail having source information MB_CS.

The image library thread 2000 obtains a mail delivered to the mail box 2110 by using a function rcv_msg( ). The image library thread 2000 searches for a function corresponding to the source information and an event or function information included in the mail. If the function is detected, the library thread 2000 executes the function. If the function is not detected, nothing is done.

The obtained mail is transferred to the mail box 2120 irrespective of execution of the corresponding function. In addition, the image library thread 2000 puts a mail having source information of MB_IMAGE, in the mail box 2120, as a notification of error information, execution result, progress and the like to the main thread. In the same way, the main thread 2100 and the sub thread 2200 send and receive messages by using the mail boxes 2140 and 2120.

The utility library 2150 and the image library are provided as an installable file stored in a recording medium such as a CD-ROM or FD. The file is provided as a part or whole of a tool kit for software development such as "SDK: Software Development Kit". In addition, the utility library 2150 and the image library can be provided via network, for example, by downloading from a Web site.

For producing the external application by using the utility library and the image library, the developer compiles the source file of the external application by using a compiler to produce an object file. Then, the object file and the utility library and the image library are linked by using a linker so that an execution file of the external application is produced. The execution file is stored in a flash card and the like, and is installed from the flash card into the compound machine, so that the external application having the utility library and the image library is mounted on the compound machine. In addition, the execution file can be installed from a server via a network.

Figure 47:
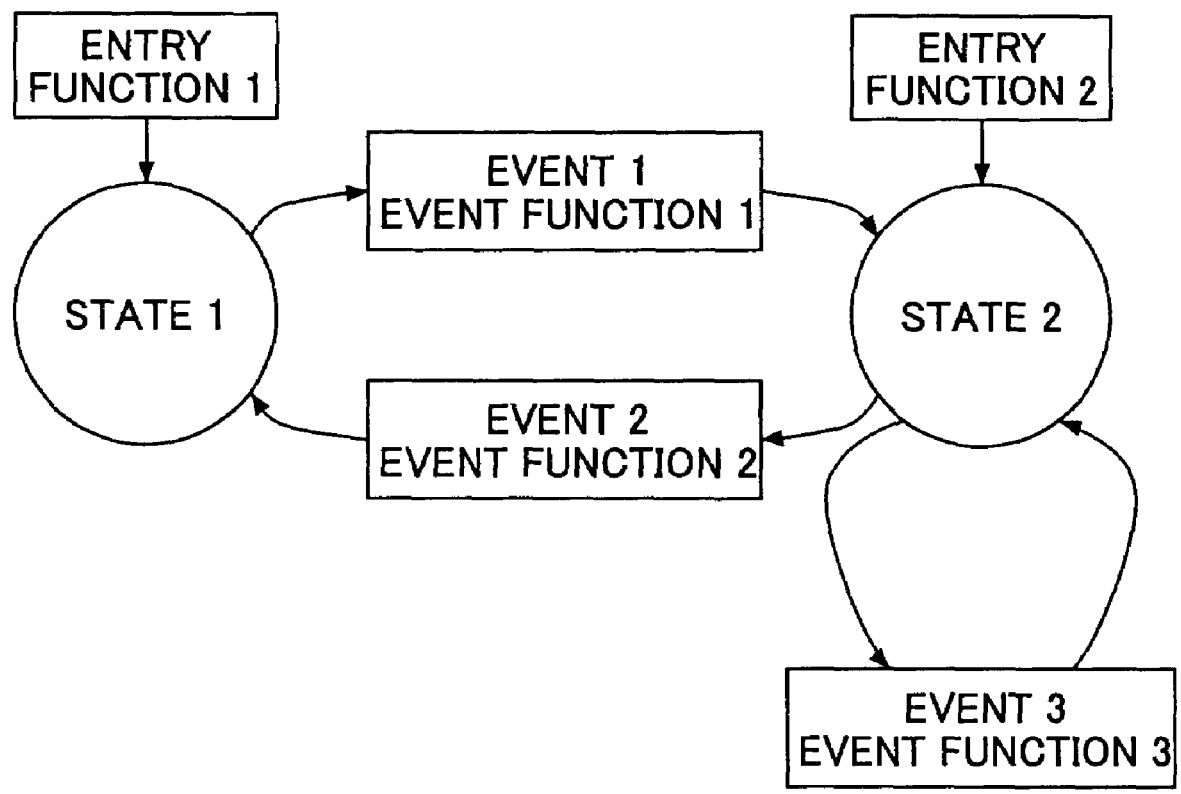
FIG. 47 shows the state transition when the external application has state 1 and state 2.

Next, the state transition model adopted by the external application will be described. FIG. 47 shows the state transition when the external application has state 1 and state 2. As shown in FIG. 47, assume that the main thread 2100 of the external application 117 includes the state 1 and the state 2, and current state is the state 1. At this state in which the main thread is in the state 1, if the main thread 2100 receives an event 1 by the function rcv_msg( ), an event function 1 is executed so that the state changes to the state 2 and an entry function 2 is executed. When the main thread 2100 is in the state 2, if the main thread receives an event 2, an event function 2 is executed so that the state is changed back to the state 1, and an entry function 1 is executed. When the main thread 2100 is in the state 2, if the main thread receives an event 3, an event function 3 is executed and the state 2 is kept.

The "state" means a state for waiting an event. The "event" is an event that triggers state transition. The "entry function" is a function executed when state transition occurs. The "event function" is a function that is executed for an event.

For producing an external application that performs event processing by using the state transition model, if every event is processed by a single module, that is, if every event is processed by a state group of the same level, the number of states increases and the number of events that are processed by a state increases. Thus, the program is complicated, so that productivity decreases and maintenance efficiency decreases.

Thus, according to the present embodiment, modules (sub modules) of state transition models are produced. Each module processes only events that are related each other among all events occurred in the external application. In addition, a module of a state transition model that controls whole modules is provided, in which this module executes sub modules as necessary by calling functions. A sub module that is called may perform function call to execute further sub modules of state transition model as necessary.

Each module does not use global variables that can be used in all of the external application. Instead, each module dynamically keeps a shared memory when the module is launched. Therefore, if the same module is called recursively, it is assured that the program is exactly executed.

Figure 48:
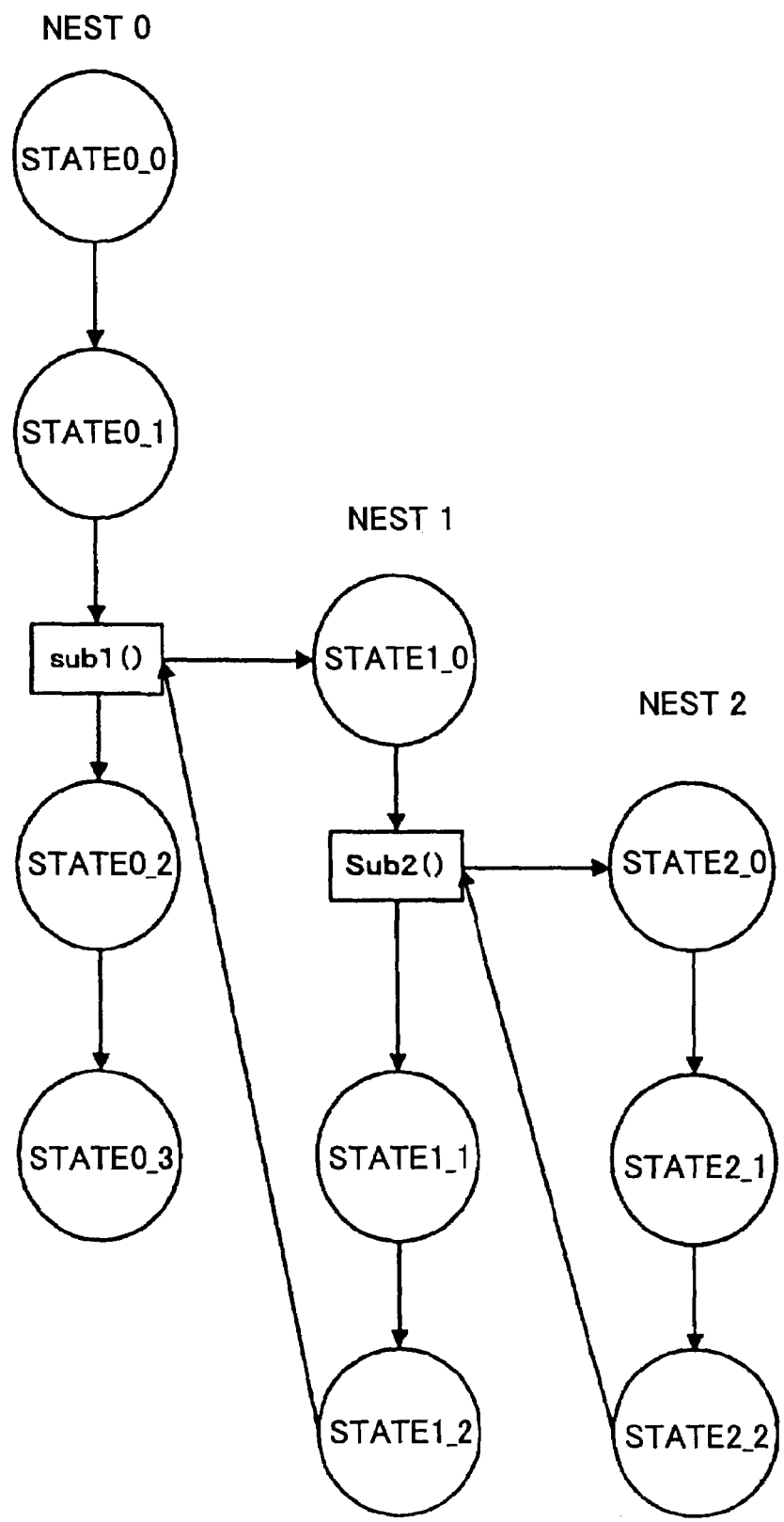
FIG. 48 shows an example of modules having a nest structure in the external application.

FIG. 48 shows an example of modules having a nest structure in the external application. In the example shown in FIG. 48, three nests (modules) exists. A module of nest 1 is called by an event function sub1( ) from nest 0, and a module of nest 2 is called by using an event function sub2( ).

Next, specific source code of the external application 117 will be described. If there is a shared variable shared among the entry functions and the event functions that are executed in modules, the variable can not be passed as an argument of a function due to limitation of function type. If such variable is defined as a global variable, there is a high possibility that a value in the variable may be unpredictably changed in modules of the nest structure or in multi threads, so that the global variable may cause fault in the external application.

According to the present embodiment, a variable can be shared in a module of a state transition model and in nested modules. FIG. 49 is an example of definition part of the source code of the external application.

As shown in FIG. 49, in the source code of the external application, variables that are treated like global variable in entry functions and event functions described in the same file are grouped, so that a structure (demoCommonParm_t) is defined shared variables. In addition, to access the shared variables easily, COMMON_STRUCT is defined.

In addition, in the example of FIG. 49, the external application 117 has two states DEMO_ST_IDLE and DEMO_ST_RUN, and event function table "eventDemoIdle" is defined for the sate of DEMO_ST_IDLE, and event function table "eventDemoRun" is defined for the state of DEMO_ST_RUN. Data in the demoStTbl[] is written in an order of states in which the entry function table and the event function table are defined. In addition, by specifying a thread number by using THREAD_NO, shared variables effective in a thread of the thread number THREAD_NO can be used.

FIG. 50 is an example of a function definition part in the source code of the external application. The function "execDemoFunc" launches a state transition model. More specifically, the function "execDemoFunc" keeps and set an area for the shared variables, and calls a state transition model launch function StMachine( ).

In the example of FIG. 50, "execDemoFUNC" calls the state transition model launch function StMachine( ) by specifying that, in a thread of the thread number THREAD_NO, according to the state information table demoStTble, state is to be launched from state number DEMO_ST_IDLE, and an area indicated by pCom is used as shared variables. In addition, descriptions of the event functions and the entry functions are included as shown in FIG. 50.

Figure 51:
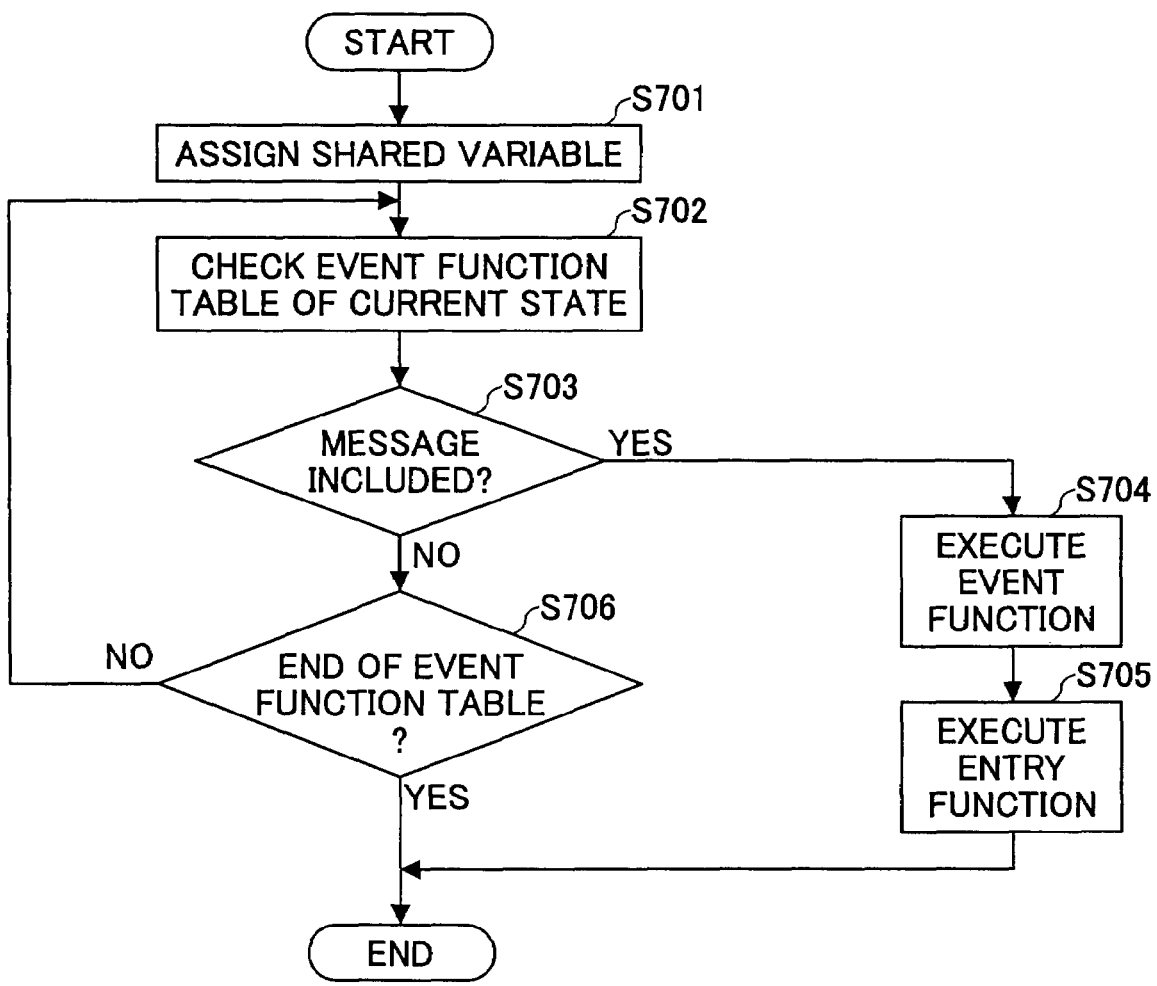
FIG. 51 is a flowchart showing the process procedure of the state transition model launch function StMachine( )

Next, processing of the state transition model launch function StMachine( ) will be described. FIG. 51 is a flowchart showing the process procedure of the state transition model launch function StMachine( ).

Figure 52:
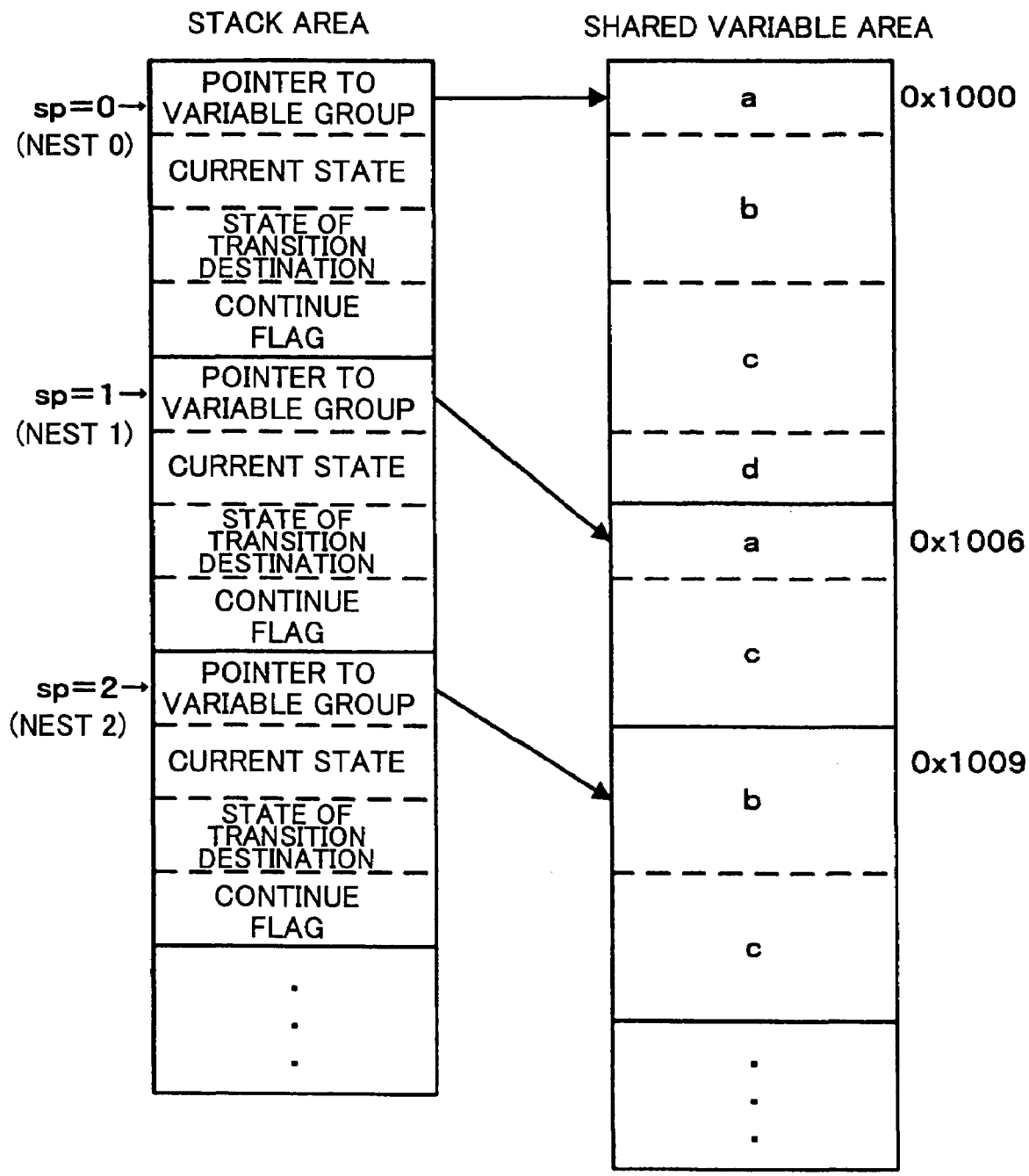
FIG. 52 shows the allocation state of the areas of the shared variables.

When the state transition model launch function StMachine( ) receives a message, the function allocates areas for shared variables in step S701. FIG. 52 shows the allocation state of the areas of the shared variables. As shown in FIG. 52, in the present embodiment, the value of a stack pointer sp directly corresponds to a nest number. For each module (nest), that is, each time when the function StMachine( ) is executed in a module, a pointer to a shared variable group is stacked on a stack area. Therefore, the shared variable is not changed accidentally in a lower layer module. Thus, as shown in FIG. 52, a shared variable having the same name can be used like a global variable while keeping an accurate value of the shared variable.

Next, the state transition model launch function StMachine( ) refers to an event function table of a current state to check the information of the table in step S702. Then, the function determines whether a received message is defined in the event function table in step S703. If the received message is defined, the state transition model launch function StMachine( ) executes an event function corresponding to the received message in step S704, and executes an entry function in step S705. If the received message is not defined in the event function table, the event function is not executed. The above mentioned processes are repeated until the end of the event function table in step S706. Accordingly, the external application produced based on the state transition model is executed.

As mentioned above, according to the compound machine of the first embodiment, the external application includes a plurality of modules of nest structure. In addition, the application includes the utility library 2150 in which the state transition model launch function is registered, wherein the state transition model launch function allocates areas each for a module to a shared variable shared among modules. Thus, the shared variable can be used safely among modules, and failures due to values of variables can be prevented. Thus, the compound machine can execute the external application stably.

Eighth Embodiment

Since the external application is produced on the basis of the state transition model according to the compound machine of the seventh embodiment, only event functions that depended on states are executed. According to the compound machine of the eighth embodiment, the external application further performs standard processing independent of any state. The structure of the compound machine of the eighth embodiment is the same as that of the seventh embodiment, and the structure of the inside of a process of the eighth embodiment is the same as that of the seventh embodiment.

In the compound machine of the eighth embodiment is configured such that a state transition model launch function StMachine( ) in the library performs standard processing.

Figure 53:
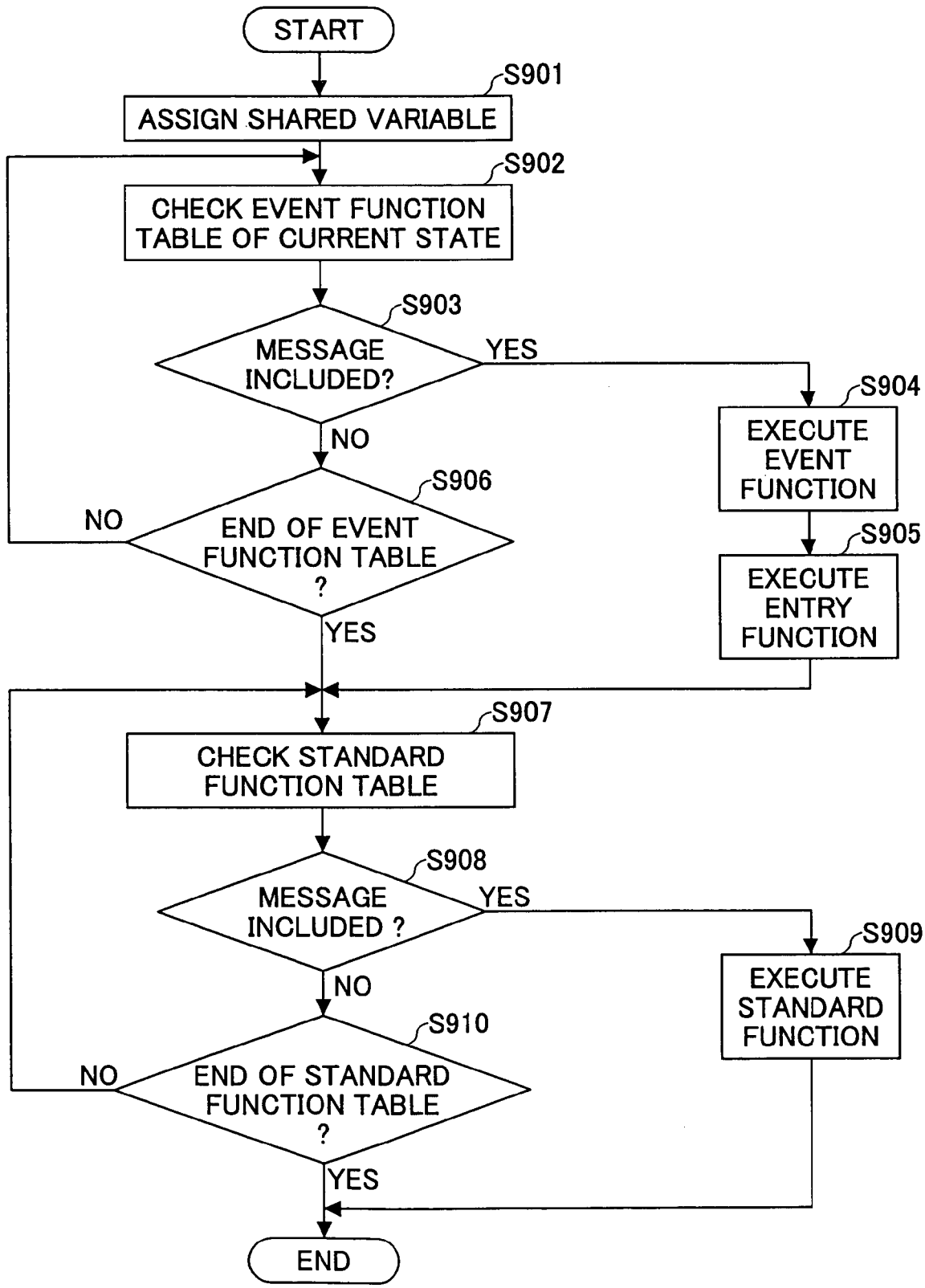
FIG. 53 shows another flowchart showing a process procedure of the state transition model launch function StMachine( ).

FIG. 53 shows a flowchart showing a process procedure of the state transition model launch function StMachine( ). The processes (steps S901-S906) from allocation of shared variables to execution of entry function are the same as those of the seventh embodiment.

The state transition model launch function StMachine( ) of this embodiment further refers to a standard function table and checks the information in step S907. The "standard function" is a function that is executed irrespectively from the current state when receiving an event. For example, the "standard function" performs a process for an event of power off, a process for notifying of presence or absence of owner authorization for an event of inquiring owner authorization of the application, or the like. The standard function table defines standard functions executed for messages, and the structure of the standard function table is the same as that of the event function table.

Then, the function determines whether a received message is defined in the standard function table in step S908. If the received message is defined, the state transition model launch function StMachine( ) executes an standard function corresponding to the received message in step S909. If the received message is not defined in the standard function table, the standard function is not executed. The above mentioned processes are repeated until the end of the standard function table in step S910. Accordingly, in the external application produced based on the state transition model, a standard function is executed irrespective of current state for an event that arrives asynchronously.

As mentioned above, according to the compound machine of the eighth embodiment, since the state transition model launch function executes the standard function, an event related to the system such as power off event can be treated without affecting other applications, so that stability of the compound machine improves. According to the seventh and eighth embodiment, the shared variable can be used safely among modules, and failures due to values in variables can be prevented.

As mentioned above, according to the present invention, an image forming apparatus is provided, in which the image forming apparatus includes:

a program obtaining part for sending a screen data for inputting a program to a client terminal, and receiving the program from the client terminal; and a program execution part for executing the program received by the program obtaining part.

According to the image forming apparatus, a program can be added or amended from an input screen of the client terminal, and the program can be executed without compiling. Thus, the operation of the program can be easily tested. Therefore, the program can be easily developed.

The image forming apparatus may include:

an operation display part for displaying a screen and inputting information; and a program obtaining part for displaying a screen on the operation display part for inputting a program and obtaining the program input from the operation display part. According to the image forming apparatus, a program can be added or amended from an input screen of the image forming apparatus.

In the image forming apparatus, the program obtaining part includes a Web server capability, and the image forming apparatus sends a html file as the screen data to the client terminal according to access from the client terminal. By using the Web server capability, the input screen data can be sent easily.

The image forming apparatus may detect an event from the client terminal and executes a CGI program corresponding to the event. By using the CGI program, processing according to instructions from the Web browser can be performed efficiently.

In the image forming apparatus, when the program is executed in the image forming apparatus, the image forming apparatus causes the client terminal to display a screen same as a screen displayed on a display part of the image forming apparatus. According to the present invention, operation of the program can be recognized in the client terminal side.

The image forming apparatus associates a key with the program according to a request from the client terminal or an operation display part of the image forming apparatus, and stores a table including correspondence between the program and the key. Thus, the user can assign a key to a program.

The image forming apparatus further includes: hardware resources used for image forming processing; control services existing between the hardware resources and an application in the image forming apparatus; wherein the program operates as the application. The program performs function call to the control services by using the program execution part.

In addition, according to the present invention, an information processing apparatus used for developing a program to be executed on an image forming apparatus is provided, in which the information processing apparatus includes:

an execution part for interpreting and executing the program;

an emulator for causing the information processing apparatus to perform processing corresponding to that to be performed by the image forming apparatus according to instructions of the program.

According to the present invention, since the emulator causes the information processing apparatus to emulate the image forming apparatus, the test of the program can be performed on the information processing apparatus, so that efficiency of development of the program improves.

The execution part is a virtual machine. Therefore, a Java program can be executed. In addition, by including a compiler for converting source code of the program to code executable by the virtual machine, the source code can be converted into byte code. In addition, by providing class libraries, a Java program can be easily developed.

In the information processing apparatus, the emulator causes the information processing apparatus to display a screen corresponding to an operation panel of the image forming apparatus. Therefore, the user can operate the information processing apparatus as if the user operate the image forming apparatus.

In addition, the emulator causes the information processing apparatus to display a list of programs and execute a program selected by the user, and the emulator causes the information processing apparatus to print data to a printer connected to the information processing apparatus for a print instruction.

In addition, the information processing apparatus may receive a screen data for inputting a program and send the program to the image forming apparatus by using the screen data.

In addition, an image forming apparatus that includes service modules for performing system side processing on image formation is provided, wherein applications can be added to the image forming apparatus separately from the service modules, the image forming apparatus includes:

a virtual machine for executing an application; and an application management part for managing the application executed by the virtual machine.

According to the present invention, an application executed on the virtual machine can be executed in the image forming apparatus. Generally, since the virtual machine absorbs differences of machine models, the application can be easily executed on the image forming apparatus.

The image forming apparatus may include an interpreter instead of the virtual machine.

In the image forming apparatus, the application management part is a loader for loading the application into the image forming apparatus from a recording medium to be connected to the image forming apparatus or from a server to be connected to the image forming apparatus via a network. Since the loader loads the application, the application can be easily executed.

The loader determines whether an application is already loaded in the image forming apparatus, executes the application if the application is loaded, and displays a loader screen if the application is not loaded.

In addition, the loader displays an application load screen on a display part of the image forming apparatus and downloads an application from a location specified by the user on the load screen, and the loader displays a list of applications and downloads an application selected from the list by the user. In addition, the loader checks, at predetermined intervals, whether an application corresponding to the downloaded application is updated in the location.

The image forming apparatus may further include: a connecting part for connecting applications and causing the image forming apparatus to perform a series of processes according to the connected applications. The connecting part displays, on a display part of the image forming apparatus, a first application and a plurality of applications that are candidates to be connected to the first application, and connects an application selected from among the plurality of applications to the first application. Accordingly, the user can customize the applications visually.

In addition, according to the present invention, an information processing apparatus including a utility library that is implemented in a program is provided, wherein the program includes nested modules in which each module is based on a state transition model, wherein, in the state transition model, operation of the program is determined according to a first state of the program, an event for the program in the state, an event function to be executed when the event occurs in the state, and a second state transferred from the first state after the event function is executed, wherein the utility library includes a state transition model launch function that assigns areas each for a module to a shared variable shared by the modules.

According to the present invention, the shared variable shared among the modules can be used safely, and failure due to values of the variables can be prevented, so that the information processing apparatus operates stably.

In the information processing apparatus, the each area is specified by a pointer in a stack area. Since the stack area that is used for function calling is used, areas for the shared variable can be assigned efficiently.

In addition, the state transition model launch function assigns areas each for a thread to a shared variable shared by threads. Thus, the shared variable can be used safely among threads.

In addition, the state transition model launch function executes an entry function that defines processing performed when state transition occurs in the state transition model. Thus, processing that is performed regularly when calling a module can be executed.

Further, the state transition model launch function executes a standard function that defines processing performed when an asynchronous event that occurs irrespective of the state occurs.

The present invention is not limited to the specifically disclosed embodiments, and variations and modifications may be made without departing from the scope of the present invention.

What is claimed is:

1. An image forming apparatus, comprising:
a program obtaining part configured to send a screen data for inputting a program to a client terminal, and receiving the program from the client terminal; and
a program execution part configured to execute the program received by the program obtaining part.

2. The image forming apparatus as claimed in claim 1, wherein the program obtaining part includes a Web server capability, and the image forming apparatus sends a html file as the screen data to the client terminal according to access from the client terminal.

3. The image forming apparatus as claimed in claim 2, wherein the image forming apparatus detects an event from the client terminal and executes a CGI program corresponding to the event.

4. The image forming apparatus as claimed in claim 1, wherein the image forming apparatus associates a key with the program according to a request from the client terminal or an operation display part of the image forming apparatus, and stores a table including correspondence between the program and the key.

5. The image forming apparatus as claimed in claim 4, the image forming apparatus displays a key assigning screen for assigning a key to the program, and assigns a key to a program according to input from the key assigning screen.

6. The image forming apparatus as claimed in claim 1, wherein the image forming apparatus executes the program for testing operation of the program.

7. The image forming apparatus as claimed in claim 1, the image forming apparatus further comprising a part configured to access a server that stores programs and downloading a program from the server.

8. The image forming apparatus as claimed in claim 1, the image forming apparatus further comprising:
hardware resources configured to perform image forming processing;
control services existing between the hardware resources and an application in the image forming apparatus;
wherein the program operates as the application.

9. A program execution method in an image forming apparatus, the program execution method comprising:
sending a screen data for inputting a program to a client terminal;
receiving the program from the client terminal; and
executing the program received from the client terminal.

10. The program execution method as claimed in claim 9, wherein the image forming apparatus sends a html file as the screen data to the client terminal according to access from the client terminal.

11. The program execution method as claimed in claim 10, wherein the image forming apparatus detects an event from the client terminal and executes a CGI program corresponding to the event.

12. The program execution method as claimed in claim 9, wherein the image forming apparatus associates a key with the program according to a request from the client terminal or an operation display part of the image forming apparatus, and stores a table including correspondence between the program and the key.

13. The program execution method as claimed in claim 12, wherein the image forming apparatus detects input of the key, and executes the program corresponding to the key by referring to the table.

14. The program execution method as claimed in claim 9, the image forming apparatus comprising:
hardware resources used for image forming processing;
control services existing between the hardware resources and an application in the image forming apparatus;
wherein the program operates as the application.

15. A computer readable recording medium storing a program causing an image forming apparatus to perform a method of obtain an application program, the method comprising:
sending a screen data for inputting an application program to a client terminal;
receiving the application program from the client terminal; and executing the application program received from the client terminal.

16. The program as claimed in claim 15, wherein the program obtaining program code includes a Web server capability, and causes the image forming apparatus to send a html file as the screen data to the client terminal according to access from the client terminal.

* * * * *

UNITED STATES PATENT AND TRADEMARK OFFICE
CERTIFICATE OF CORRECTION

PATENT NO.        : 7,554,685 B2
APPLICATION NO.   : 10/626608
DATED             : June 30, 2009
INVENTOR(S)       : Tsutomu Ohishi et al.

It is certified that error appears in the above-identified patent and that said Letters Patent is hereby corrected as shown below:

Title page, Item (75), remove "Kunihiro Akiyoshi, Yuuko Sugiura, Mitsuo Ando".

Signed and Sealed this

Thirteenth Day of October, 2009

David J. Kappos
*Director of the United States Patent and Trademark Office*